(12) United States Patent
Colombi et al.

(10) Patent No.: US 7,375,989 B2
(45) Date of Patent: May 20, 2008

(54) AC/DC CONVERTER AND METHOD OF MODULATION THEREOF

(75) Inventors: Silvio Colombi, Losone (CH); Nicolas Borgeaud, Breganzona (CH); Chris Van Kalken, Muralto (CH)

(73) Assignee: General Electric Company, Schenectady, NY (US)

( * ) Notice: Subject to any disclaimer, the term of this patent is extended or adjusted under 35 U.S.C. 154(b) by 241 days.

(21) Appl. No.: 11/237,422

(22) Filed: Sep. 28, 2005

(65) Prior Publication Data

US 2006/0164873 A1   Jul. 27, 2006

Related U.S. Application Data

(60) Provisional application No. 60/647,739, filed on Jan. 27, 2005, provisional application No. 60/647,660, filed on Jan. 27, 2005.

(51) Int. Cl.
*H02M 1/12* (2006.01)
*H02M 1/14* (2006.01)

(52) U.S. Cl. .................... 363/44; 363/84; 363/125

(58) Field of Classification Search ............... 363/44, 363/45, 84, 89, 125, 127
See application file for complete search history.

(56) References Cited

U.S. PATENT DOCUMENTS

| | | | | | |
|---|---|---|---|---|---|
| 5,969,484 | A | * | 10/1999 | Santi et al. | 315/247 |
| 6,043,997 | A | * | 3/2000 | He et al. | 363/44 |
| 6,049,473 | A | * | 4/2000 | Jang et al. | 363/89 |
| 6,075,716 | A | * | 6/2000 | He et al. | 363/44 |
| 6,122,183 | A | * | 9/2000 | He et al. | 363/44 |
| 6,346,797 | B1 | * | 2/2002 | Perreault et al. | 322/29 |
| 6,456,514 | B1 | * | 9/2002 | Perreault et al. | 363/89 |
| 6,757,185 | B2 | * | 6/2004 | Rojas Romero | 363/89 |
| 6,781,351 | B2 | * | 8/2004 | Mednik et al. | 323/222 |

\* cited by examiner

*Primary Examiner*—Bao Q. Vu
(74) *Attorney, Agent, or Firm*—Cantor Colburn LLP

(57) ABSTRACT

A method and apparatus for modulating a discontinuous conduction mode (DCM) Boost Rectifier having a switchable booster section is disclosed. A modulation signal is defined according to the equation, $T_{ON}(\phi)=f1(\phi)+f2(\phi)+f3(\phi)$. Here, $\phi$ defines a phase angle for an input phase voltage of the DCM Boost Rectifier; $T_{ON}(\phi)$ defines a modulation characteristic for an ON time of the booster section, and is a continuous function; $f1(\phi)$ defines a first function from $0 \leq \phi \leq \pi/3$; $f2(\phi)$ defines a second function from $\pi/3 \leq \phi \leq 2\pi/3$; and, $f3(\phi)$ defines a third function from $2\pi/3 \leq \phi \leq \pi$. The switchable booster section is then modulated using the modulation signal.

20 Claims, 19 Drawing Sheets

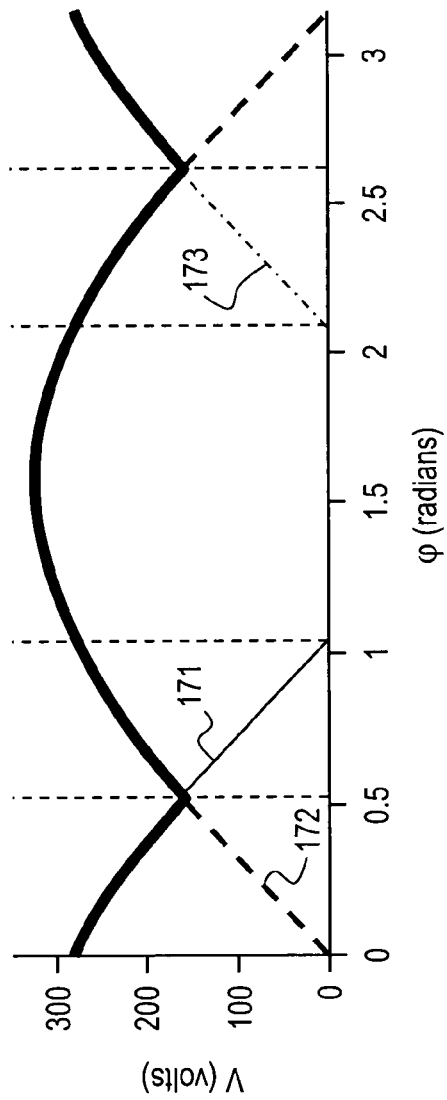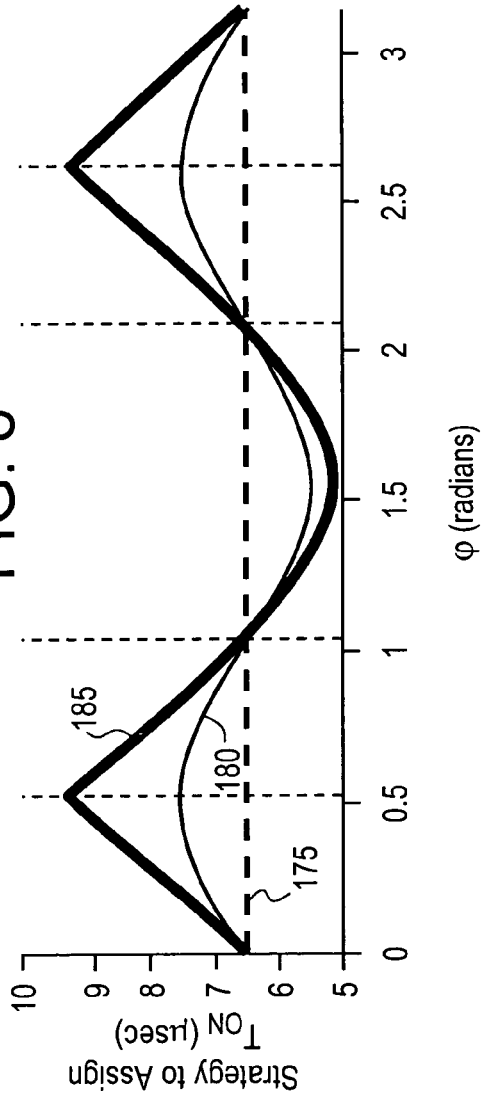

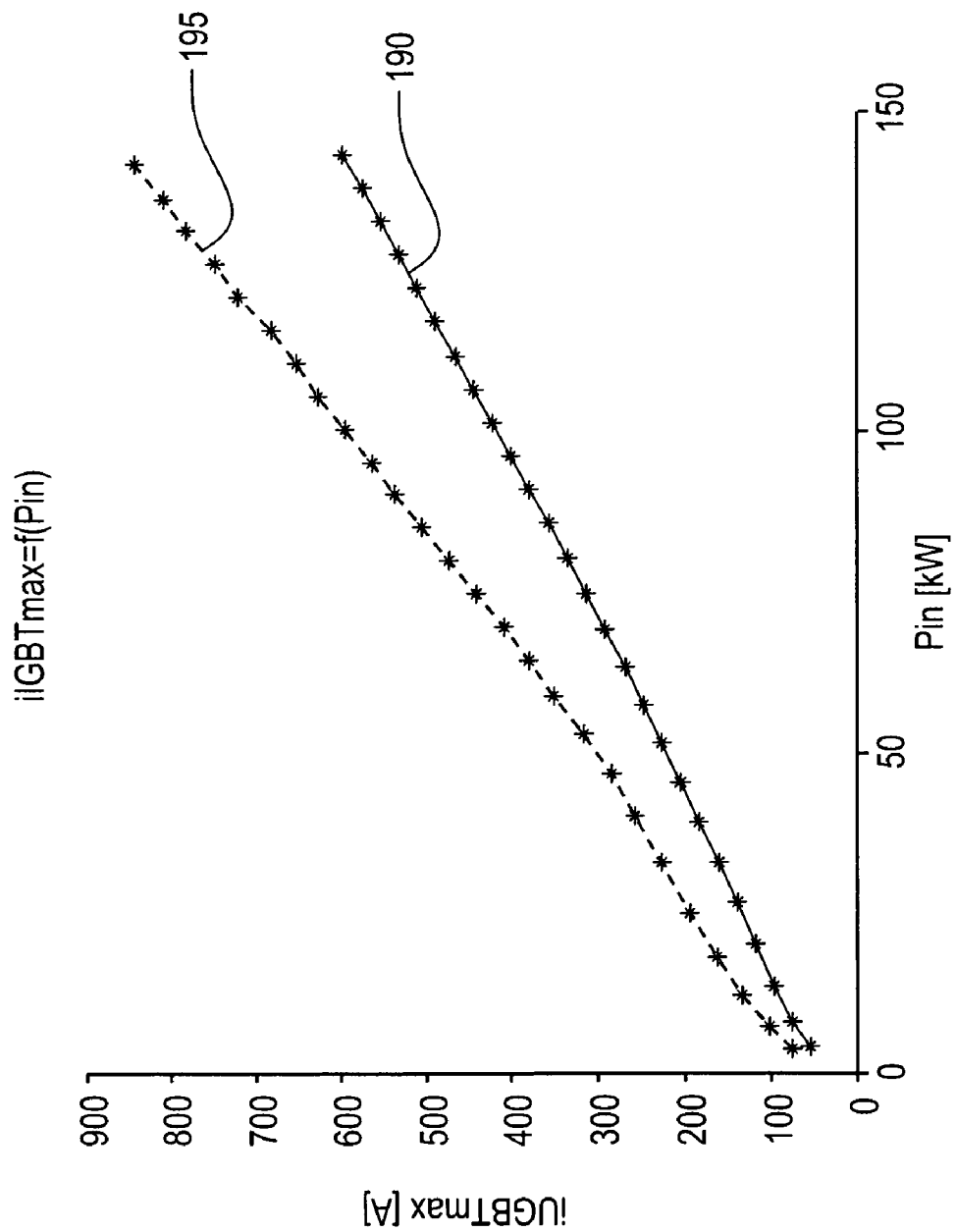

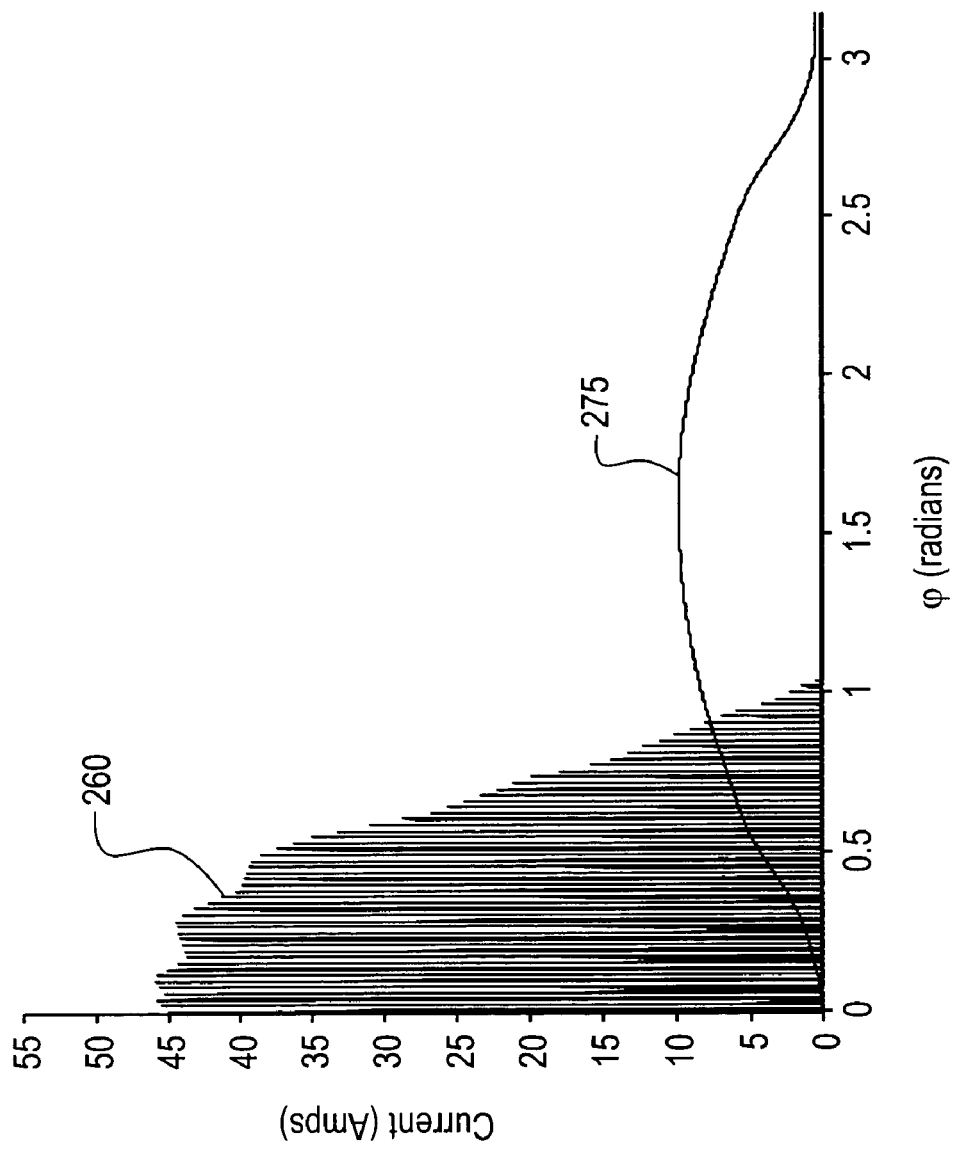

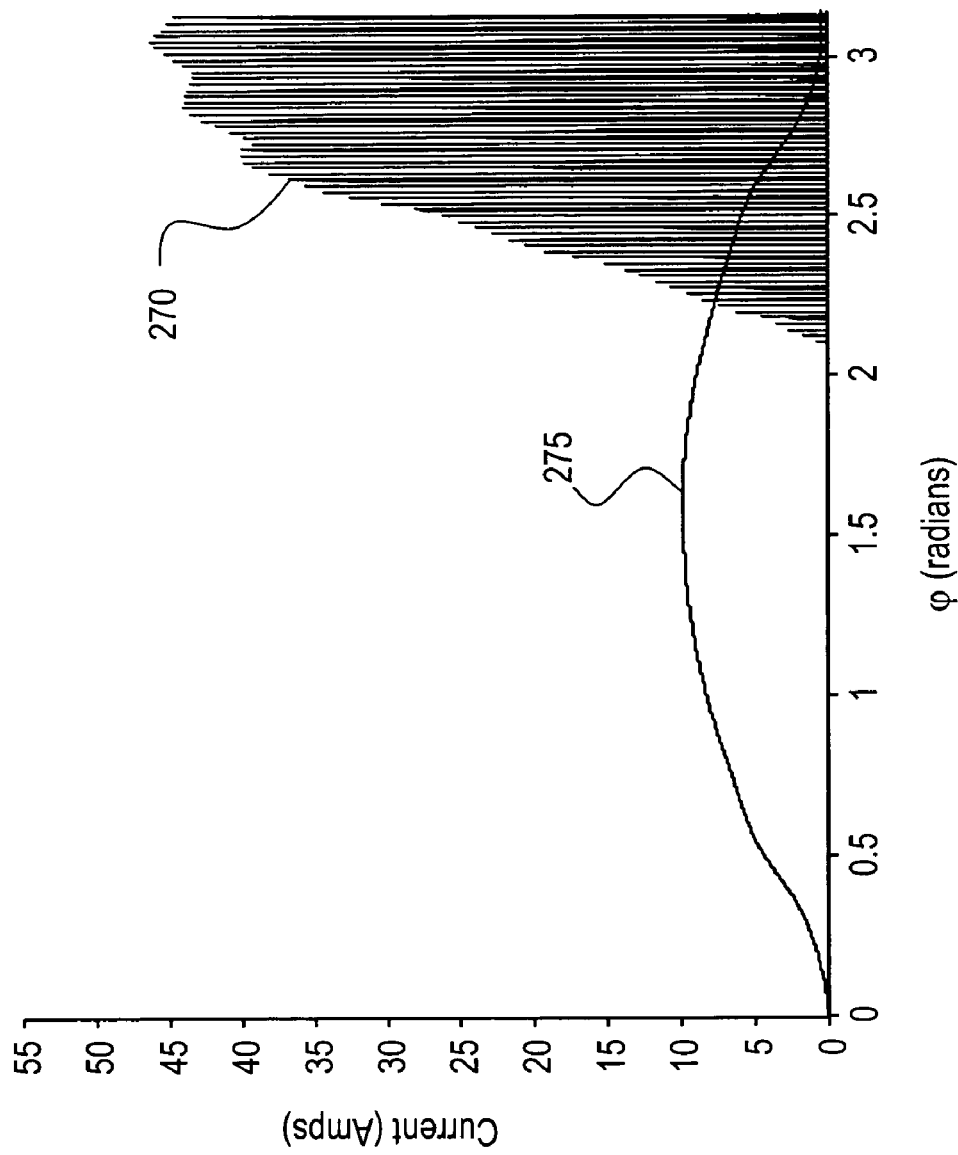

1

AC/DC CONVERTER AND METHOD OF MODULATION THEREOF

CROSS REFERENCE TO RELATED APPLICATIONS

This application claims the benefit of U.S. Provisional Application Ser. No. 60/647,739, filed Jan. 27, 2005, and of U.S. Provisional Application Ser. No. 60/647,660, filed Jan. 27, 2005, each of which is incorporated herein by reference in its entirety.

BACKGROUND OF THE INVENTION

The present disclosure relates generally to ac/dc converters, particularly to rectifier topologies, and more particularly to discontinuous conduction mode (DCM) boost rectifiers and methods of modulation the same.

There are several topologies and control methods to realize medium to high power front end converters. In general, it is desirable for these rectifiers to operate at a high power factor (PF) and with a low total harmonic distortion (THD), especially when the converter is connected to the electrical grid of a utility. Typical applications for these converters include: UPSs (Uninterruptible Power Supplies), frequency converters and drives. A well known topology is the Two Switch Three Level DCM (Discontinuous-Conduction-Mode) Boost Rectifier. This topology is quite popular in three phase transformerless UPSs for its excellent performance/cost ratio. With just two active switches in the booster section it is possible to reach very good PF and THD on the overall load range. Also, the efficiency of the converter is very high (typically 98%) with respect to more complex and expensive active IGBT (Insulated Gate Bipolar Transistor) rectifiers. The modulation strategy for the switches has an important influence on the overall behavior of the rectifier, in particular on the input THD and on the stress on the IGBTs (peak current, blocking voltage, and losses, for example). Several modulation strategies have been proposed and are currently used in industrial products. However, to reduce the THD possible with the existing art, one has to consider alternative topologies or additional passive filters. Existing alternative topologies have other drawbacks, such as stress on the IGBT's, and whereas additional passive filters may improve the THD, they do so on just a limited load range, and introduce potential resonance when a generator is used in place of the grid.

Accordingly, and to further the technical arts relating to DCM Boost Rectifiers, it would be advantageous to determine an optimal modulation strategy that minimizes a desired cost function.

BRIEF DESCRIPTION OF THE INVENTION

An embodiment of the invention includes a method for modulating a discontinuous conduction mode (DCM) Boost Rectifier having a switchable booster section. A modulation signal is defined according to the equation, $T_{ON}(\phi)=f1(\phi)+f2(\phi)+f3(\phi)$. Here, $\phi$ defines a phase angle for an input phase voltage of the DCM Boost Rectifier; $T_{ON}(\phi)$ defines a modulation characteristic for an ON time of the booster section, and is a continuous function; $f1(\phi)$ defines a first function from $0 \leq \phi \leq \pi/3$; $f2(\phi)$ defines a second function from $\pi/3 \leq \phi \leq 2\pi/3$; and, $f3(\phi)$ defines a third function from $2\pi/3 \leq \phi \leq \pi$. The switchable booster section is then modulated using the modulation signal.

Another embodiment of the invention includes an apparatus for modulating a discontinuous conduction mode (DCM) Boost Rectifier having a switchable booster section. The apparatus includes a processor operable in response to executable instructions for performing the aforementioned method.

BRIEF DESCRIPTION OF THE DRAWINGS

Referring to the exemplary drawings wherein like elements are numbered alike in the accompanying Figures:

FIG. 7 depicts exemplary phase voltages in accordance with an embodiment of the invention;

FIG. 8 depicts exemplary modulation strategies for assigning the time $T_{ON}$ in accordance with an embodiment of the invention;

FIG. 9 depicts maximal IGBT currents as a function of input power for the rectifier of FIG. 1;

DETAILED DESCRIPTION OF THE INVENTION

An embodiment of the invention provides a six-switch three-level DCM boost rectifier (depicted in FIG. 3 and discussed further below) that beneficially improves the THD over an entire load range by individually boosting each rectified phase of input power.

Another embodiment of the invention provides a quasi-optimal modulation signal for advantageously controlling the booster section of a DCM boost rectifier, whether it is a two-switch three-level, or a six-switch three-level DCM boost rectifier. In an embodiment, a quasi-optimal modulation signal is established using a cost function analysis, and the resulting signal used for controlling the ON time of switchable boost rectifiers, thereby advantageously controlling the booster section.

Figure 1:
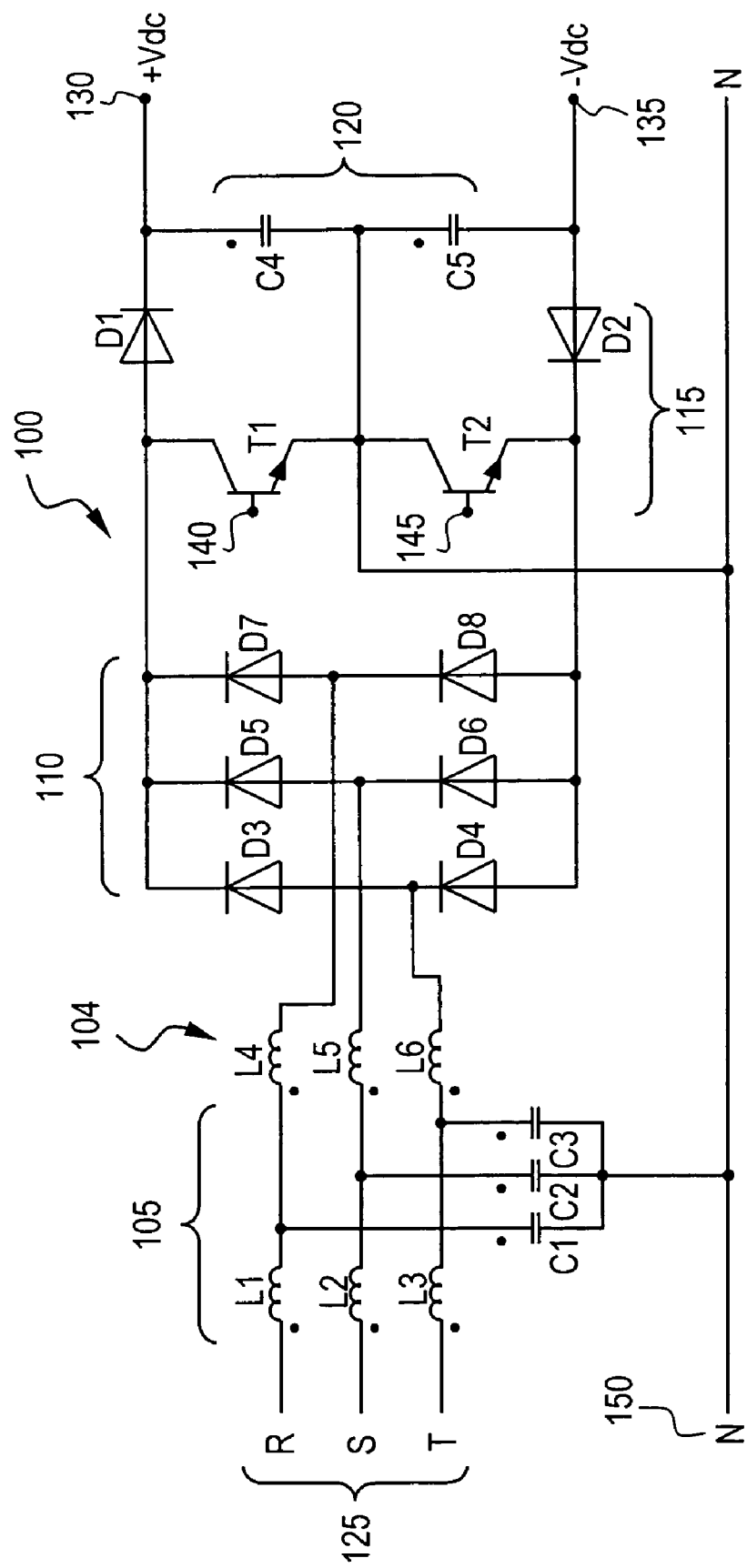
FIG. 1 depicts in block diagram form a schematic of an exemplary boost rectifier for use in accordance with an embodiment of the invention.

FIG. 1 shows in block diagram form a schematic of a classic two-switch three-level DCM boost rectifier 100. The rectifier 100 is composed of a three phase LC input filter arrangement ($L_1C_1$, $L_2C_2$, $L_3C_3$) 105, a three-phase booster inductance arrangement ($L_4$, $L_5$, $L_6$) 104, a three-phase diode rectifier set ($D_3$ to $D_8$) 110, a booster section ($T_1$ and $T_2$, $D_1$ and $D_2$) 115, and DC link output capacitors $C_4$, $C_5$ 120. In general, the topology of rectifier 100 allows the three AC voltages R-S-T 125 to be rectified and boosted into two symmetric DC voltages +Vdc and −Vdc, also herein referred to as outputs 130, 135. In an embodiment, $T_1$ and $T_2$ of booster section 115 consists of IGBTs, and the operation of rectifier 100 consists of switching those two IGBTs. The upper transistor $T_1$ is used to control the output voltage +Vdc, whereas the lower transistor $T_2$ is used to control the output voltage −Vdc. The on and off state of $T_1$ and $T_2$ is controlled by switching at base terminals 140, 145. System neutral N is designated by reference numeral 150, with each output capacitor $C_4$, $C_5$ being disposed between its respective output terminal 130, 135 and the neutral 150. In an embodiment, connections for the three AC voltages R-S-T 125 is provided by a utility main, which is also herein referred to as the mains.

The modulation strategy for the two switches $T_1$ and $T_2$ has an important influence on the overall behavior of the rectifier 100, and in particular on the input THD and on the stress on the IGBTs. Several modulation strategies have been proposed and are currently used in industrial products. However, these typical strategies do not offer a low input THD on the overall load range of the rectifier 100 together with a limited stress on the IGBTs $T_1$ and $T_2$.

Figure 2:
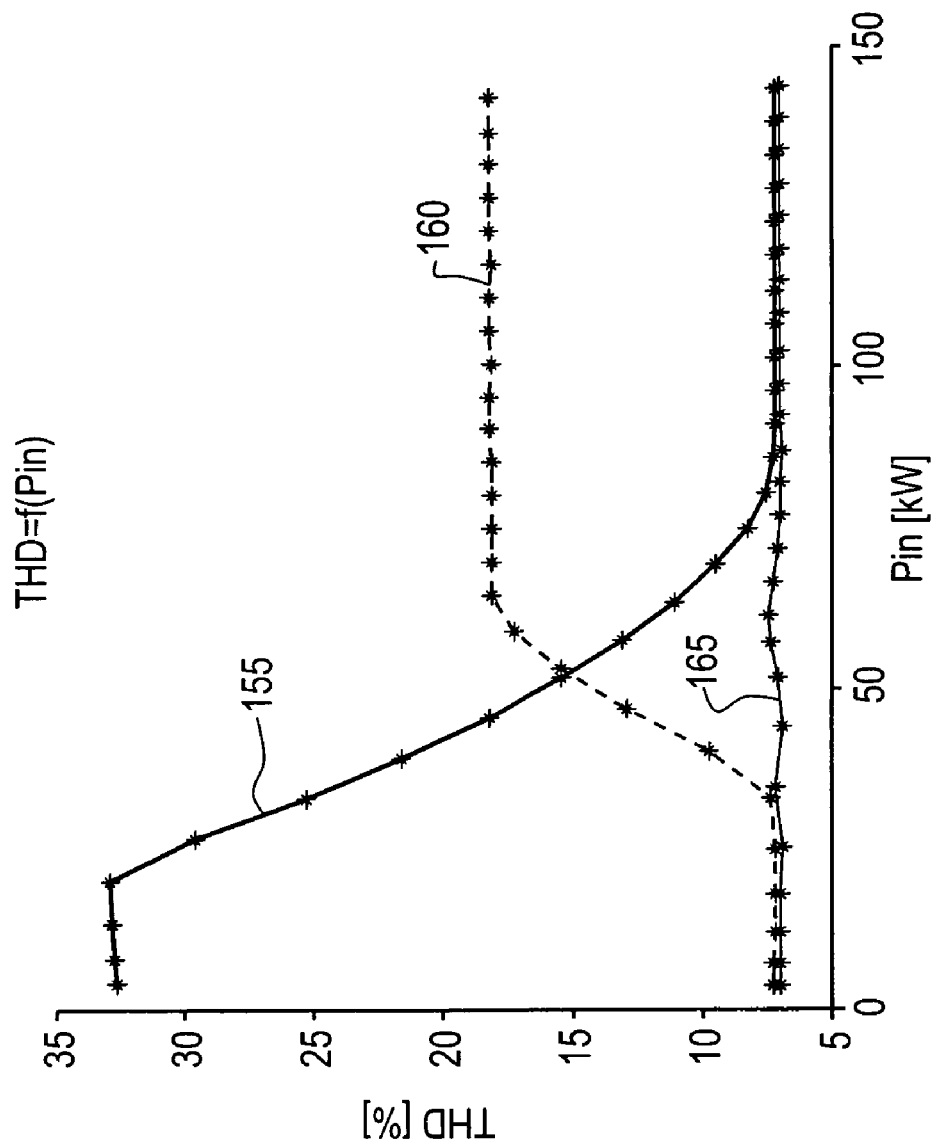
FIG. 2 depicts characteristic curves of the boost rectifier of FIG. 1 used in accordance with an embodiment of the invention.

FIG. 2 compares the input THD(%) as a function of the input power Pin(kW) of the configuration of FIG. 1 obtained with three different modulation strategies: a fixed $T_{ON}$ control strategy 155; an average current control strategy 160; and, a quasi-optimal modulation control strategy 165. Quasi-optimal modulation will be discussed in more detail below. For the results illustrated in FIG. 2, the following variable values were used: $L_b$=30 μH(80 kVA), Vdc=400V, Vrms=230V, $f_{pmax}$=16.67 kHz. Where, $L_b$ represents boost inductors $L_4$, $L_5$ and $L_6$, Vdc represents the output voltage as illustrated at 130, 135, Vrms represents the rms input voltage at R-S-T 125, and $f_{pmax}$ represents the maximal switching frequency for the IGBTs.

As can be seen in FIG. 2, the THD for the $T_{ON}$ fixed strategy 155 is low for high Pin situations, while THD for the average current strategy 160 is low for low Pin situations. As can also be seen, the quasi-optimal modulation strategy 165 achieves the best of both situations. The establishment and implementation of such a quasi-optimal modulation control strategy 165 will be discussed in more detail below.

Figure 3:
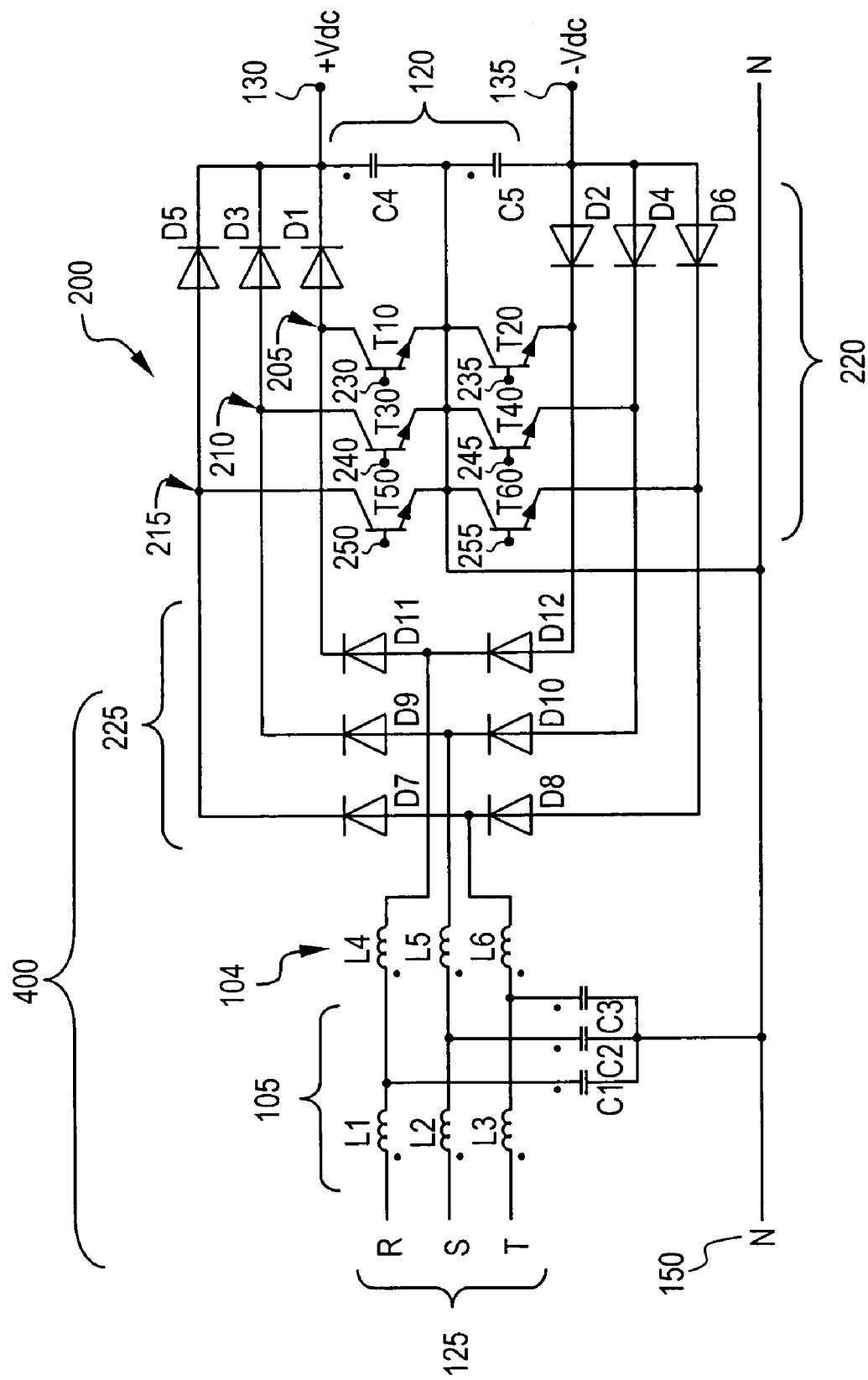
FIG. 3 depicts in block diagram form a schematic of an exemplary boost rectifier in accordance with and for use in accordance with an embodiment of the invention.

FIG. 3 shows in block diagram form a schematic of an embodiment of the invention of a six-switch three-level DCM boost rectifier 200. Like elements between the boost rectifier 200 of FIG. 3 and the boost rectifier 100 of FIG. 1 are numbered alike. The main difference between the six-switch rectifier 200 and the classic two-switch rectifier 100 of FIG. 1 is that every individual rectified phase of the six-switch rectifier 200 is separately and independently boosted with a different booster ($T_{10}$, $T_{20}$ and $D_1$,$D_2$) 205, ($T_{30}$, $T_{40}$ and $D_3$,$D_4$) 210 and ($T_{50}$, $T_{60}$ and $D_5$,$D_6$) 215, which are collectively referred to as the booster section 220. Thus, each rectifier pair ($D_7$,$D_8$; $D_9$,$D_{10}$; and $D_{11}$,$D_{12}$) of the rectifier set 225 of the six-switch rectifier 200 is individually connected with its respective booster 205, 210, 215. The two switches of each separate booster section available per phase ($T_{10}$, $T_{20}$; $T_{30}$, $T_{40}$; and $T_{50}$, $T_{60}$) of the six-switch rectifier 200 allow a substantial improvement of the input THD over the two-switch rectifier 100, as each phase may be individually controlled. The input filters 105 serve to filter noise and/or harmonic distortion upstream to each respective rectifier pair of rectifier set 110, 225.

In general, the block diagrams of FIGS. 1 and 3 are also herein referred to as rectifier topologies, which may be employed on a three-phase electrical system having, for example, a UPS.

Similar to the transistors $T_1$ and $T_2$ of FIG. 1, the on and off state of transistors $T_{10}$, $T_{20}$, $T_{30}$, $T_{40}$, $T_{50}$ and $T_{60}$ of FIG. 3 may be controlled by switching at base terminals 230, 235, 240, 245, 250 and 255, respectively, thereby enabling the separate and independent control of each separate booster section 205, 210, 215 via a modulated signal, which will be discussed in more detail below.

The outputs of booster sections 205, 210 and 215, on the downstream side of diode pairs D1-D2, D3-D4 and D5-D6, are combined to provide the aforementioned output voltages +Vdc 130 and −Vdc 135, which in an embodiment are symmetrical dc voltages.

Viewing the boost rectifier 200 of FIG. 3 another way, LC input filters 105, booster inductances 104, and rectifier set 225 may be viewed as an input circuit 400, and the booster section 220 may be viewed as an output circuit. Here, the input circuit 400 is configured for receiving three-phase ac power, and for delivering three-phase rectified power, while the output circuit 220 is configured for receiving the three-phase rectified power, individually boosting the power of each rectified phase, and delivering boosted dc power to a first and second output terminal 130, 135.

Figure 4:
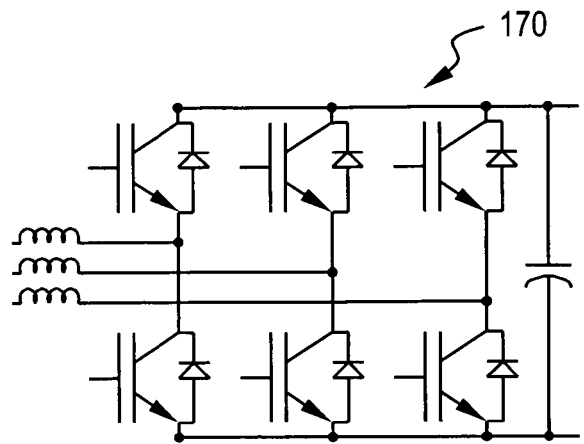
FIG. 4 depicts a schematic of an exemplary active rectifier for use in accordance with an embodiment of the invention.

A classic IGBT active rectifier 170 having six IGBTs is illustrated in FIG. 4. While an embodiment of the invention may employ a converter topology also having six IGBTS, as illustrated by rectifier 200 of FIG. 3, several advantages are offered by rectifier 200. As used herein, the term converter is used as a general reference to either the two-switch DCM boost rectifier 100 of FIG. 1 or the six-switch DCM boost rectifier 200 of FIG. 3. For example, due to the discontinuous conduction mode of operation, the six-switch three-level DCM boost rectifier 200 has a higher efficiency, a better EMI behavior, and no stability issues with the input LCL filter 105. Also, the new converter includes switches ($T_{10}$, $T_{20}$; $T_{30}$, $T_{40}$; and $T_{50}$, $T_{60}$) that may be used for a battery booster, for a UPS application for example, thereby allowing a lower voltage battery string to be used. On the other hand, a classic IGBT active rectifier topology (see FIG. 4) would require two additional switches to do the same.

Figure 5:
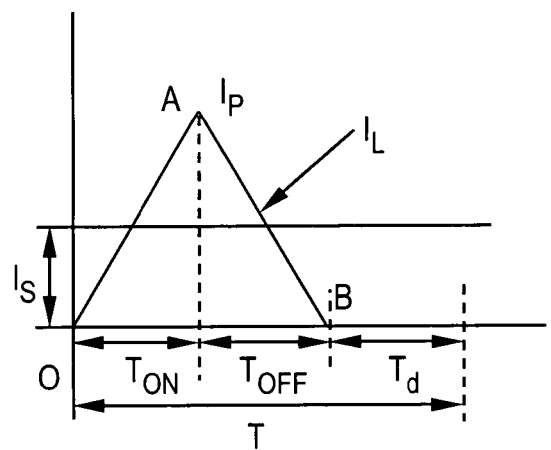
FIG. 5 depicts an exemplary switching interval for use in accordance with an embodiment of the invention.

Referring now to FIG. 5, a typical switching interval T is illustrated that may be used for switching one of the transistors $T_1$, $T_2$, $T_{10}$, $T_{20}$, $T_{30}$, $T_{40}$, $T_{50}$ and $T_{60}$ of FIGS. 1 and 3, via its respective base terminal, in the case of a discontinuous conduction mode. In FIG. 5, T represents the overall switching interval, $T_{ON}$ represents the switch on time, $T_{OFF}$ represents the switch off time, $T_d$ represents the delay time from an off cycle to an on cycle, $I_L$ represents the inductor current through the respective phase inductor of LCL filter 105 (that is, for the two-switch rectifier 100, $I_L$ is through all boost inductors $L_4$, $L_5$ and $L_6$, and for the six-switch rectifier 200, $I_L$ is through the respective boost inductor associated with the activated switch), $I_P$ represents the peak inductor current, $I_S$ represents the average current over one switching interval T, determined by the surface of the triangle in FIG. 5 divided by T, point O represents time zero, point A represents the time to current peak, and point B represents time to current zero. As used herein, inductors $L_4$, $L_5$ and $L_6$ will be referred to as boost inductors, and will be generally designated as $L_b$.

The application of the switching interval T of FIG. 5 will now be discussed in reference to the upper booster ($T_1$, $D_1$) and the R-phase of FIG. 1. When transistor $T_1$ is switched on, the voltage across inductor $L_4$ is the voltage V across capacitor $C_1$, and the current through the inductor increases (from point O to point A in FIG. 5). Assuming a constant voltage V during the $T_{ON}$ condition, the peak current $I_P$ may be determined approximately by Equation-1.

$$L_b * I_P/T_{ON} = V, \qquad \text{Equa.-1}$$

where, as discussed before, $L_b$ ("boost" inductor in Henries (H)) is representative of $L_4$, $L_5$ or $L_6$, depending on the phase under consideration. Here, $L_b$ is representative of $L_4$. When transistor $T_1$ is switched off, the voltage across inductor $L_4$ is the difference between the voltage V across capacitor $C_1$ and the DC link voltage +Vdc, the current through the inductor decreases (from point A to point B in FIG. 5). Again, assuming a constant voltage V during the $T_{OFF}$ condition, Equation-2 applies.

$$-L_b * I_P/T_{OFF} = V - Vdc. \qquad \text{Equa.-2}$$

Figure 6:
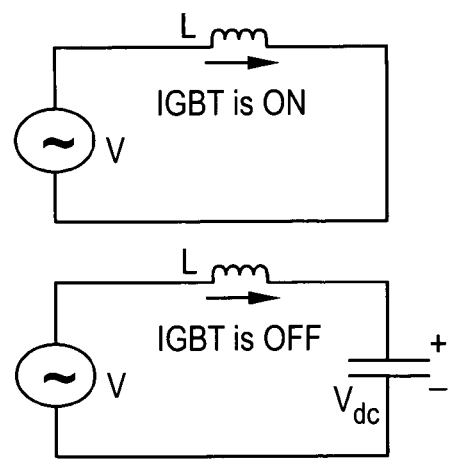
FIG. 6 depicts a single-phase equivalent circuit for the on and off states of a boost transistor in accordance with an embodiment of the invention.

FIG. 6 shows a single-phase equivalent circuit for the on and off states of an IGBT for transistor $T_1$. The active power Pin drawn by rectifier 100 may be expressed approximately by Equation-3.

$$P_{in} \approx (3/2) Vrms^2 T_{ON}/L_b, \qquad \text{Equa.-3}$$

where the approximation is related to the rms value of the booster inductor currents that depends mainly on the ratios (switching frequency/input voltage frequency) and (Vdc/Vrms). Equation-3 is a reasonable approximation in most practical cases, and the ratio ($T_{ON}/L_b$) is very useful for sizing the converter.

The modulation strategy for an embodiment of the two-switch three-level DCM boost rectifier 100 will now be discussed.

As shown by Equation-3, the active power drawn by the rectifier 100 is proportional to $T_{ON}$. Therefore, the simplest possible way to operate the rectifier 100 is to increase $T_{ON}$ with the power demand. With this solution, the THD at the input is very high, typically around 33%, which is typically the baseline for this type of converter.

Depending on how the switching frequency and the ratio ($T_{ON}/L_b$) are selected, it may happen that at the end of the switching time T, the inductor current has not reached zero (that is, ($T_{ON}+T_{OFF}$)>T in FIG. 2). Here, a solution is to let the current decrease down to zero and then to switch the IGBT ($T_1$ for example) on again. In this case, however, we are at the limit of a continuous conduction mode. This strategy is referred to as fixed TON (see the characteristic curve 155 of FIG. 2)

Another strategy, referred to as average current control, has also been discussed above (see the characteristic curve 160 of FIG. 2). Here the idea is to determine the $T_{ON}$ time in order to draw a given average current over every switching interval. By making this reference average current sinusoidal and in phase with the input voltages, it is possible to determine the $T_{ON}$ time that minimizes the input THD. The average current over one switching interval T is determined by the surface of the triangle in FIG. 5 divided by T. After some computations, Equation-4 is obtained.

$$T_{ON}(\phi) = K * sqrt[Vdc(\phi) - Vmax(\phi)], \qquad \text{Equa.-4}$$

where $\phi$ is the phase angle referring to the input phase voltages, K is a factor proportional to the active power to be drawn, Vmax is the voltage of the input phase having the maximum amplitude, and $T_{ON}(\phi)$ defines a continuous function modulation characteristic for assigning an ON time for the respective switches of booster section 115, 220. FIG. 7 shows a typical behavior of the phase voltages V[volts] vs. $\phi$[radians], and FIG. 8 shows some strategies to assign the time $T_{ON}$, $T_{ON}$[µsec] vs. $\phi$[radians]. Both FIGS. 7 and 8 are plotted as a function of the angle $\phi$, which refers to the first phase of the input voltages. In this example, we have considered the upper IGBT ($T_1$) of the booster 115 and a constant voltage Vdc. The vertical dashed lines represent $\phi = \pi/6$, $2\pi/6$, $4\pi/6$ and $5\pi/6$.

The three voltage curves 171, 172 and 172 depicted in FIG. 7 provide an indication of the three booster currents in the three inductors $L_4$, $L_5$ and $L_6$, respectively, shown in FIG. 1.

Three strategies are shown in FIG. 8 to assign modulation shapes for $T_{ON}(\phi)$. The strategy 175 represents the case for no modulation, fixed $T_{ON}$ or $T_{ON}$=constant. The strategy 180 represents the case for sinusoidal modulation such as modulation based on a $3^{rd}$ harmonics variation. The strategy 185 represents the case for quasi-optimal modulation such as modulation corresponding to the average current control according to Equation-4.

Referring back to FIG. 2, it is interesting to compare the performance of the fixed $T_{ON}$ and Average Current Control strategies. As previously discussed, FIG. 2 illustrates the input THD as a function of input power Pin to rectifier 100, while FIG. 9 illustrates the maximal IGBT current as a function of the input power $P_{in}$ of rectifier 100 for the two strategies of fixed $T_{ON}$ (see curve 190 of FIG. 9) and Average Current Control (see curve 195 of FIG. 9). In FIG. 2, the initial portion of the fixed $T_{ON}$ strategy (curve 155 of FIG. 2) corresponds to the case where no modulation is used and a THD of 33% is obtained. At higher input powers, the THD of the fixed $T_{ON}$ strategy improves and is better than the average current control (curve 160 of FIG. 2), while at low power the situation is the opposite. FIG. 9 was developed using the same design case as used for FIG. 2.

From FIG. 9, it can be observed that the average current control strategy generated more stress on the IGBTs than does the fixed $T_{ON}$ strategy, as evidenced by the higher maximal IGBT current over all input power conditions.

A comparison of FIGS. 2 and 9 suggests that a combination of the two strategies may be beneficial.

An embodiment of the invention includes a quasi-optimal modulation strategy for both a two-switch and a six-switch three-level DCM boost rectifier. The quasi-optimal modulation for the two-switch topology will be discussed first.

Figure 10B:
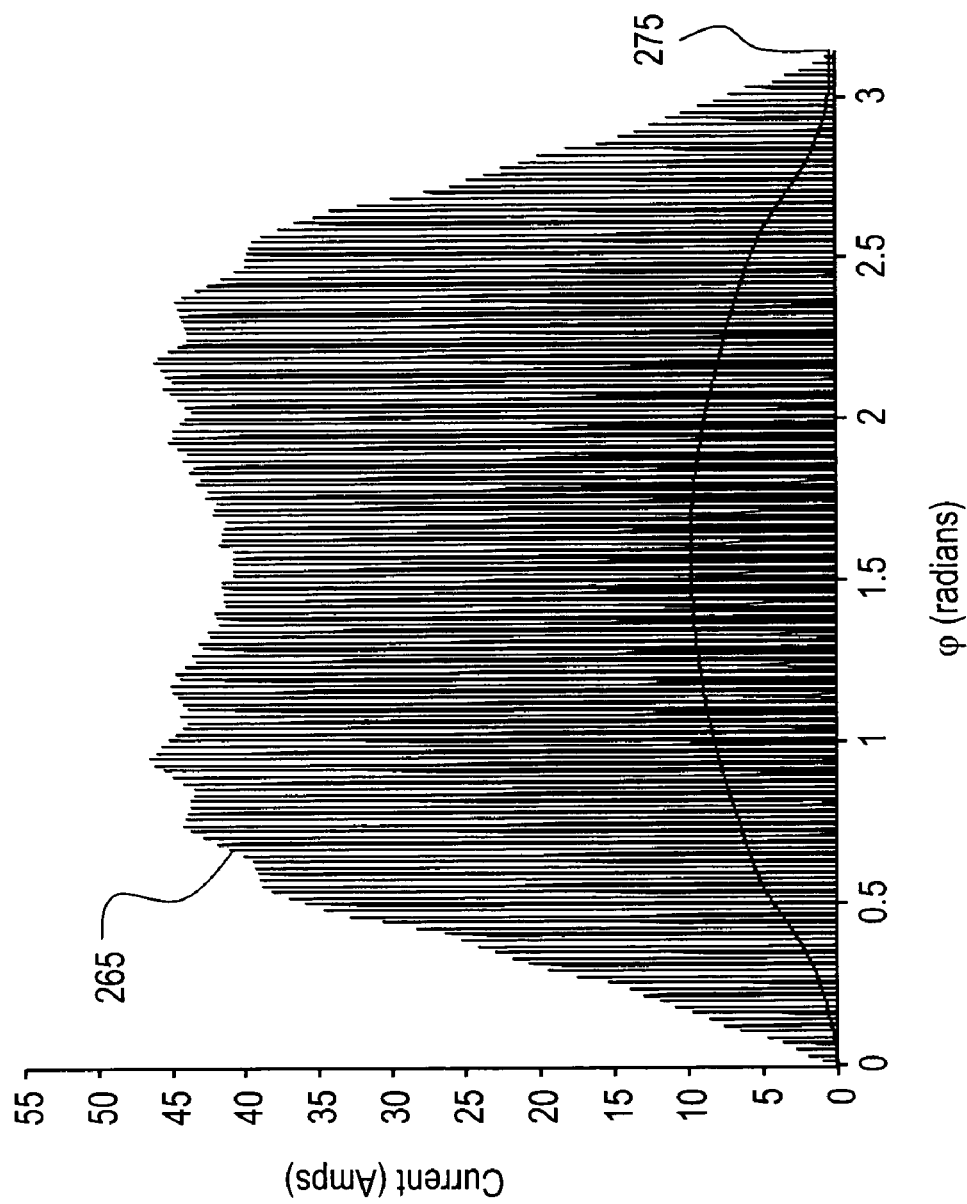
FIG. 10 depicts simulated booster currents and a phase current in accordance with an embodiment of the invention.

From the previous discussion it is clear that the $T_{ON}$ modulation strategy has an important influence on the overall behavior of the rectifier. In particular, though the input power drawn is always proportional to the mean value of the time $T_{ON}$, the input THD and the stress on the IGBTs are heavily influenced by the actual shape of variation of $T_{ON}$ over a period of $2\pi/3$ (see FIG. 8 from $\phi=0$ to $\phi=2\pi/3$). Accordingly, it would be beneficial to be able to determine what the optimal modulation strategy is. The general form of the optimal modulation is $T_{ON}(P_{in},\phi)$, in other words a different shape $T_{ON}(\phi)$ for every input power $P_{in}$. Before addressing the general problem, a quasi-optimal solution is considered. Here, the idea is to fix the shape of the modulation, define it with a limited number of parameters, and then iteratively search the solution that minimizes or satisfies a specified cost function, thereby defining a quasi-optimal modulation strategy. As used herein, the term cost function refers to the well known cost function that defines a function having the parameters of input prices and output quantity, where the resulting solution defines the cost of making the output given the input prices. This process is carried out in a numerical simulation. For solving an exemplary cost function associated with an embodiment of the invention, a program in Matlab™ (available from The MathWorks, Inc.) was been developed. The model included the switching details of the boost current and allowed the computation of all the internal variables of the rectifier ($\phi=0$ to $\pi$) as well as the input THD. As an example, FIG. 10 shows the resulting simulated booster currents 260, 265 and 270 of $L_b$, as well as one (R-phase) line current 275 for the average current control strategy of FIG. 8 (strategy curve 185), with reference being to the first phase of the input voltages.

Figure 11:
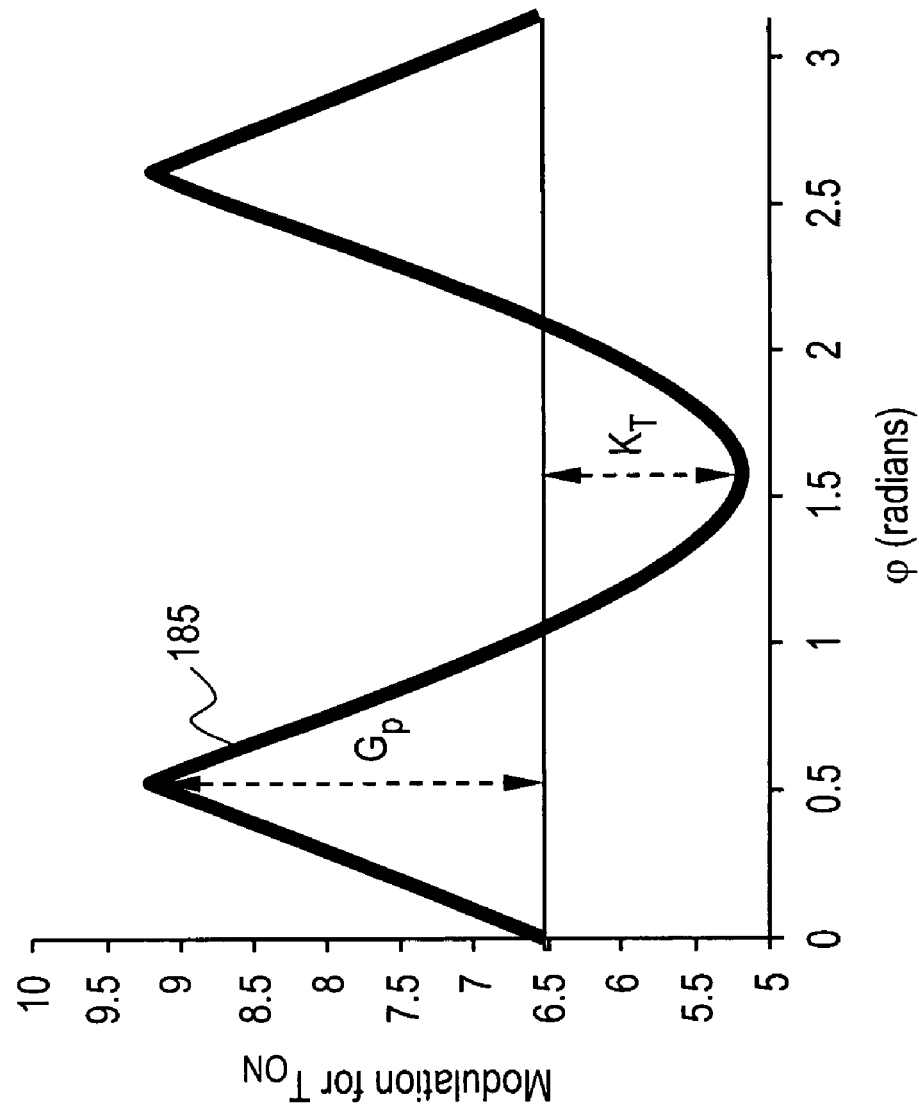
FIG. 11 depicts the shape of a modulation signal in accordance with an embodiment of the invention.

The aforementioned iterative search method was used to find the quasi-optimal modulation strategy for a specific design case. In an embodiment, the modulation shape given by the average current control strategy was selected, that is, strategy curve 185 of FIG. 8, whose shape is modeled using two coefficients $K_T$ and $G_p$ as represented in FIG. 11. In general, FIG. 11 represents a modulation shape, or signal, for assigning a $T_{ON}$ condition to each IGBT of the booster section (booster section 115 in the case of a two-switch topology, and booster section 220 in the case of a six-switch topology), as a function of phase angle ($\phi=0$ to $\pi$) referred to the first phase of the input voltages.

The modulation shape may be considered to be composed of two triangular portions ($\phi\in[0,\pi/3]$ and $\phi\in[2\pi/3, \pi]$) defined by the coefficient $G_p$, and of one $3^{rd}$ harmonic portion ($\phi\in[\pi/3,2\pi/3]$) defined by the coefficient $K_T$. Typical cost functions (CF) to minimize during the iterative search are given by Equations 5 and 6.

$$CF=THD, \text{ and} \quad \text{Equa.-5}$$

$$CF=THD+I\_IGBTmax/I\_IGBTmean. \quad \text{Equa.-6}$$

Figure 12:
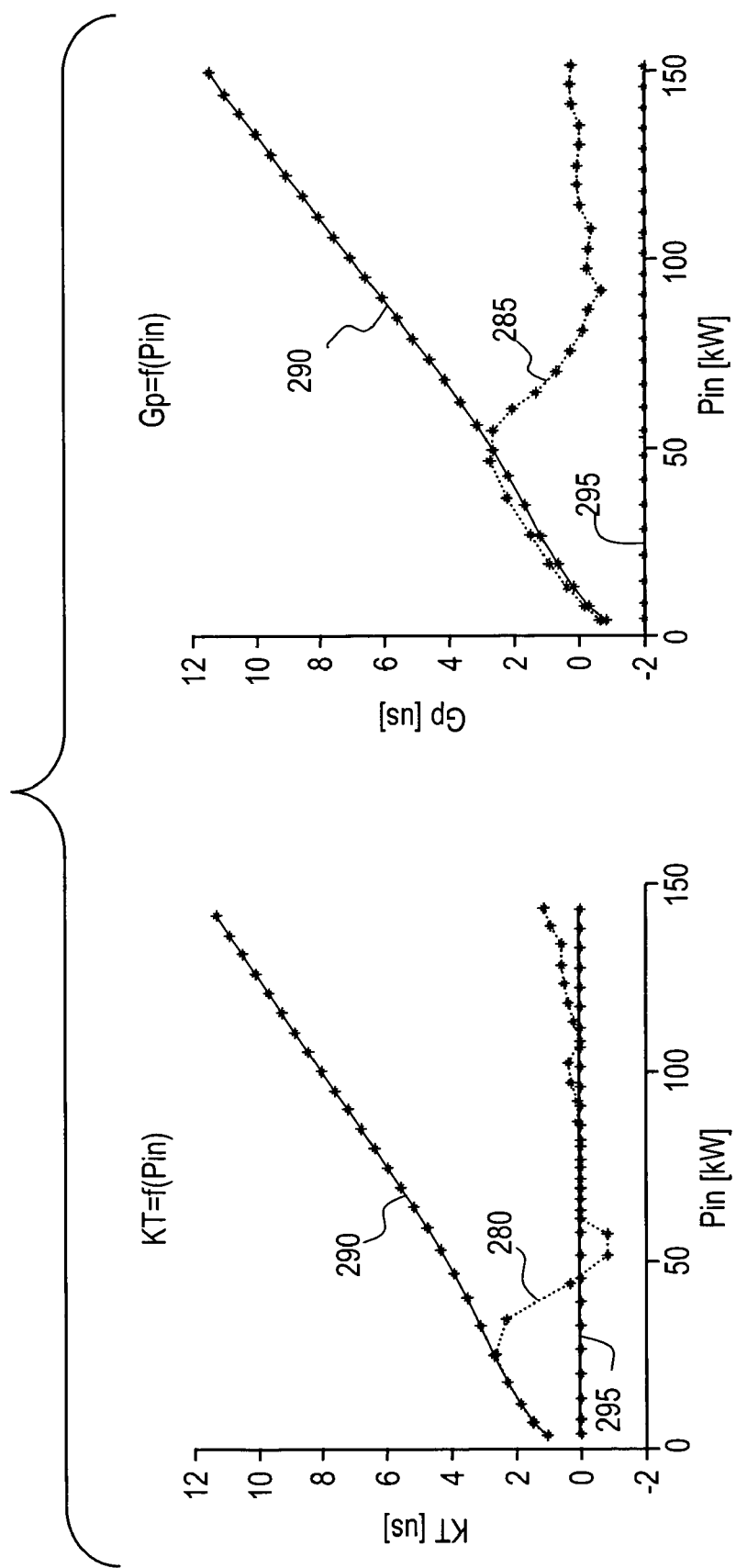
FIG. 12 depicts coefficient values, as a function of input power, for the modulation signal of FIG. 11 for use in accordance with an embodiment of the invention.
Figure 13:
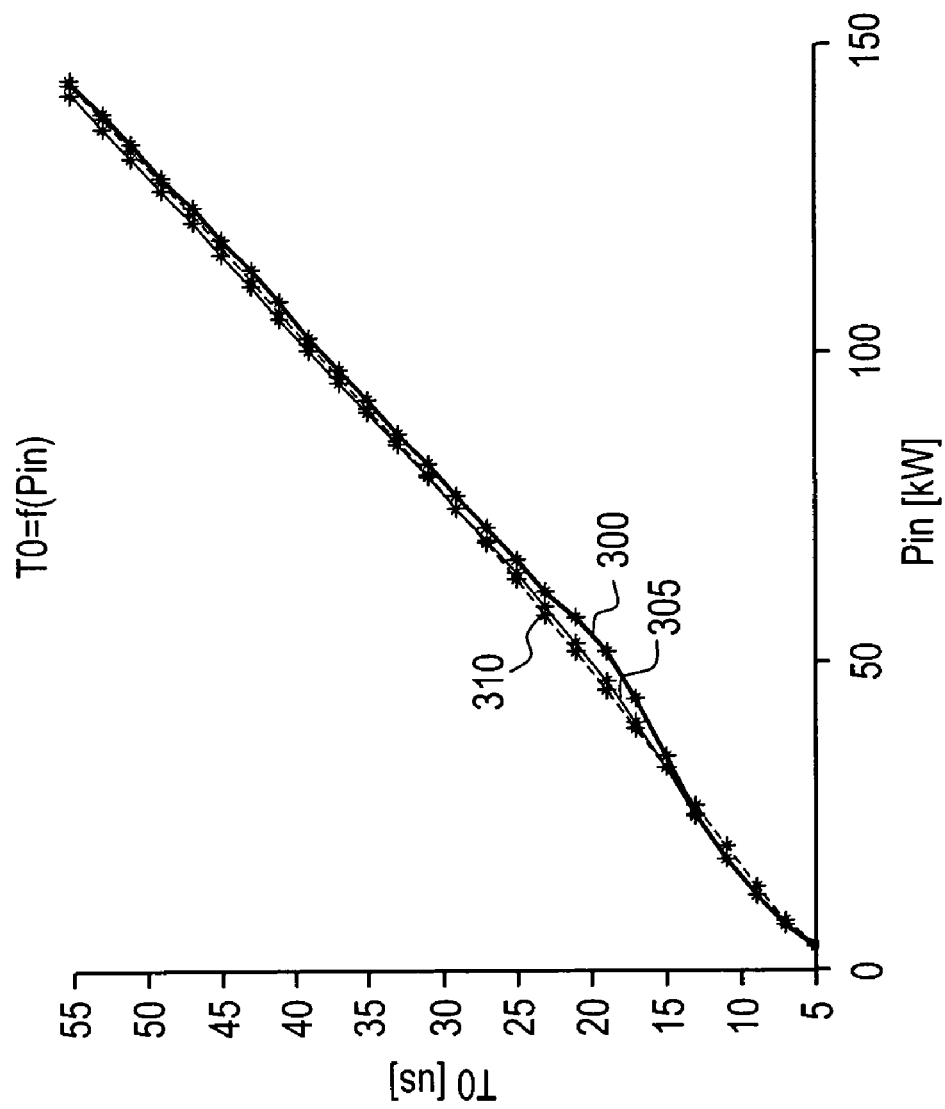
FIG. 13 depicts another coefficient value, as a function of input power, relating to the modulation signal of FIG. 11 for use in accordance with an embodiment of the invention.

Considering the cost function of Equation-5 and the following design case, $$L_b=30\ \mu H,\ V_{dc}=400V,\ V_{mains\text{-}rms}=230V,\ f_{pmax}=16.67\ kHz, \quad \text{Equa.-7}$$

the iterative search method gives the values of the coefficients $K_T$ and $G_p$ as a function of the required input power $P_{in}$. The results for $K_T$ and $G_p$ are represented by the curves 280, 285, respectively, in FIG. 12, which also shows the average current control strategy 290, and the fixed $T_{ON}$ control strategy 295. In principle, the search method also determines the variation of the coefficient $T_0(P_{in})$, that is, the mean value of $T_{ON}$. FIG. 13 shows coefficients $T_0$ as a function of the required input power Pin(kW) for the fixed $T_{ON}$ control strategy (curve 310), the average current control strategy (curve 305), and the quasi-optimal modulation control strategy (curve 300). FIG. 13 also shows that $T_0$ is approximately proportional to $P_{in}$, which allows one to consider $T_0$ (instead of $P_{in}$) as the output of a voltage controller for switching the IGBTs, and therefore allows one to implement only two tables ($K_T(T_0)$ and $Gp(T_0)$). This way, the voltage controller (represented by reference numeral 350 in FIG. 14) has to deal with the non-linearity $T_0(P_{in})$.

Figure 14:
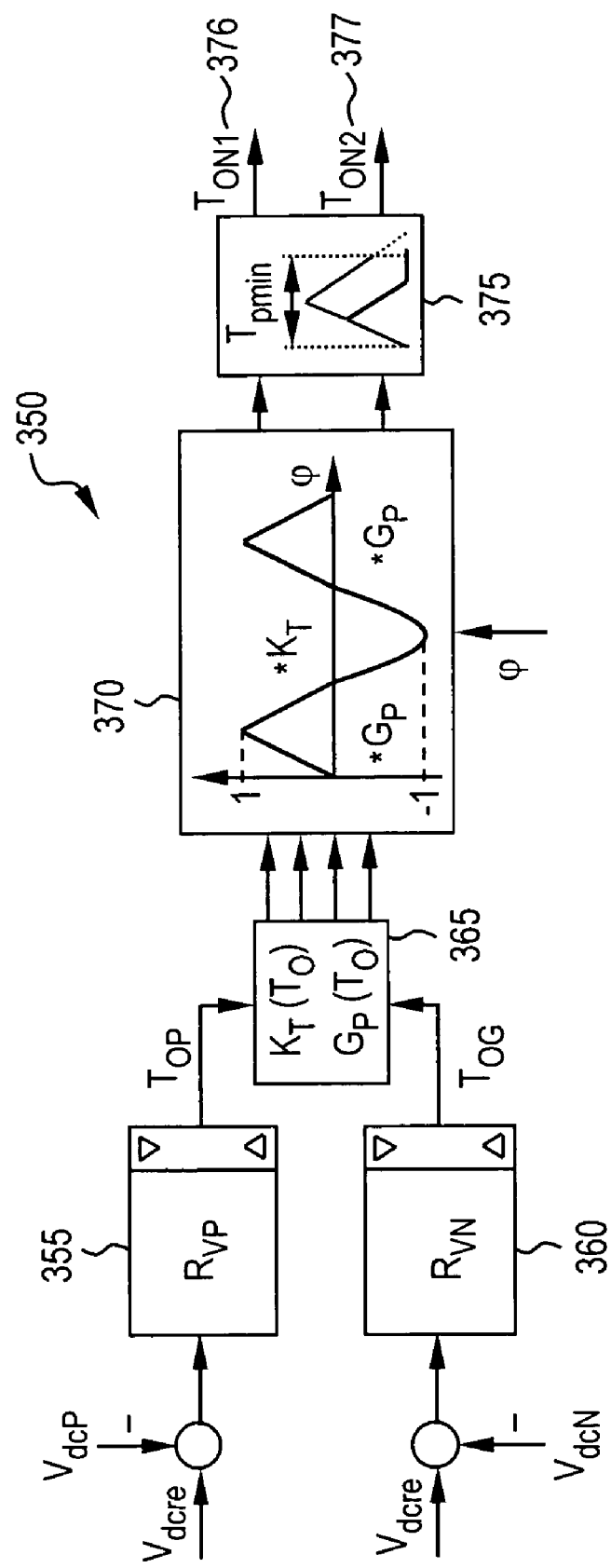
FIG. 14 depicts a block diagram of a rectifier controller in accordance with and for use in accordance with an embodiment of the invention.

FIG. 14 shows a block diagram of rectifier controller 350 employing a quasi-optimal modulation control strategy. In general, any block of rectifier controller 350 may be viewed as being a processor operable in response to executable instructions for carrying out the processes herein described. Note that for each pair of boosters the upper and lower boosters have two different voltage controllers 355, 360 demanding two different values $T_{OP}$ ($T_0$ positive) and $T_{OG}$ ($T_0$ negative). Also, the final $T_{ON}$ times for both the IGBTs may be increased at block 375 if the corresponding currents do not reach zero before the minimal switching period. In this case, the switching frequency is reduced. At block 365 the values of $K_T$ and $G_P$ are determined, either by a look up table, or by real time iterative analysis relating to an operational parameter of the DCM boost rectifier, and at block 370 the modulation signal for assigning the $T_{ON}$ times is determined using the values of $K_T$ and $G_P$. The output of block 375 includes $T_{ON}$ times $T_{ON1}$ 376 and $T_{ON2}$ 377, which are provided to upper and lower boosters of a booster section, such as $T_1$ and $T_2$ of booster section 115. For the six-switch topology of FIG. 3, the booster section 220 is controlled as three pairs of upper and lower boosters.

Referring back to FIG. 2 as a point of reference, the input THD for the fixed TON control (curve 155), the average current control (curve 160), and the quasi-optimal modulation strategy (curve 165) are compared.

Figure 15:
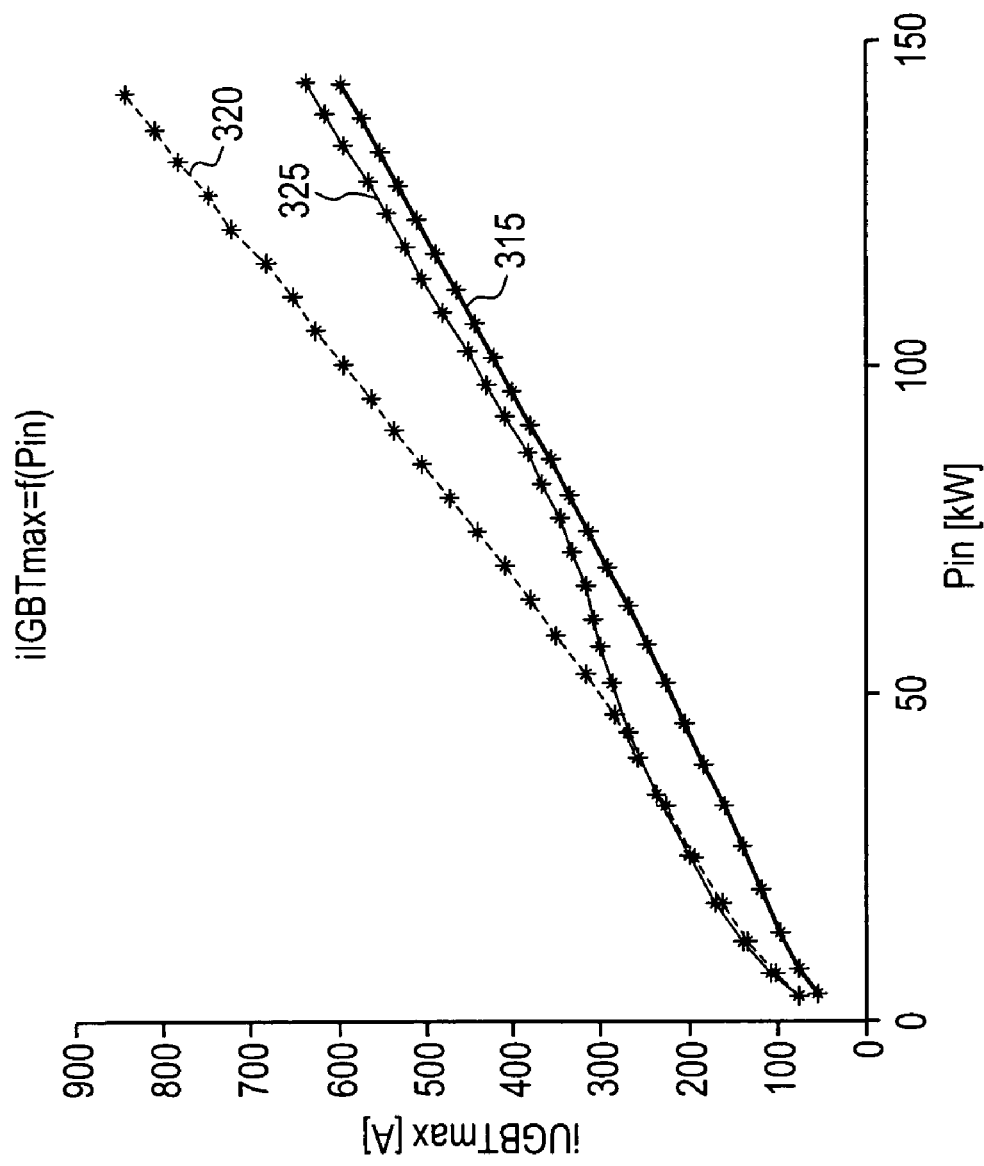
FIG. 15 depicts maximal IGBT currents as a function of input power similar to that depicted in FIG. 9, but also including data relating to a quasi-optimal modulation strategy in accordance with and embodiment of the invention.

Referring now to FIG. 15, the maximal IGBT current for these same three strategies is shown for the same design case as used to develop FIG. 2. The three strategies are identified as: fixed $T_{ON}$ control (curve 315), average current control (curve 320), and quasi-optimal modulation strategy (curve 325). A comparison of FIGS. 2 and 15 shows that with the quasi-optimal modulation strategy (curves 165 and 325, respectively) it is possible to obtain an input THD of less then 7.5% for every load, and at the same time maintaining a limited maximal IGBT current. As a side note, it is noted that the results indicated in FIG. 2 do not include the three-phase LC filter ($L_1$-$C_1$, $L_2$-$C_2$ and $L_3$-$C_3$) represented in FIG. 1. With the three-phase LC filter included, an additional 1% will be added to the input THD. It is this three-phase LC filter that prevents the high frequency harmonics generated by the booster switching from being injected back into the mains, thereby affecting the THD of the input voltage.

Figure 16:
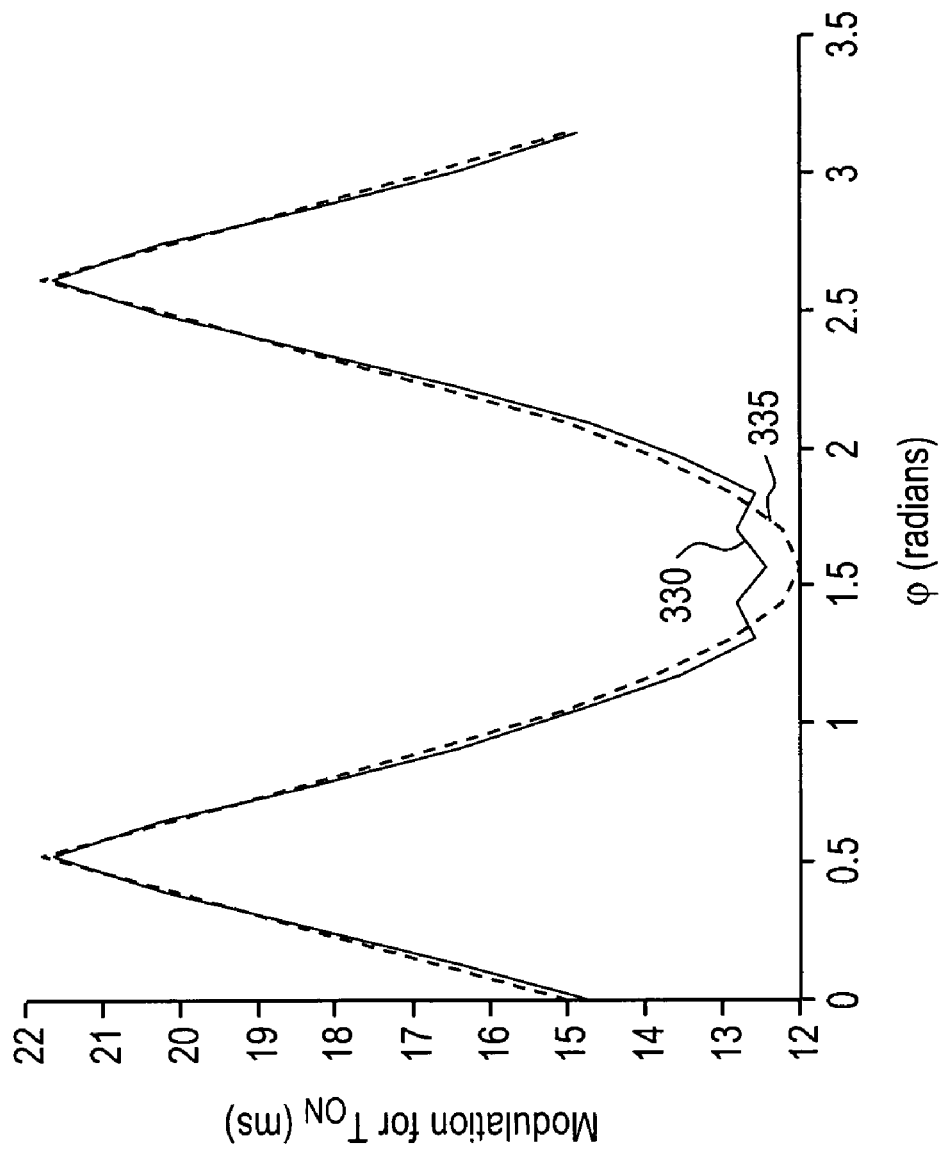
FIG. 16 depicts an exemplary optimal modulation strategy and quasi-optimal modulation strategy in accordance with an embodiment of the invention.

The quasi-optimal modulation strategy described above is based on a fixed shape of the modulation (see FIG. 11), which can be described with a limited number of parameters. As discussed before, the general form of the optimal modulation is $T_{ON}(P_{in},\phi)$, in other words, a different shape $T_{ON}(\phi)$ for every input power $P_{in}$. The optimal modulation may be determined by an iterative search that modifies for every input power $P_{in}$ the whole shape $T_{ON}(\phi)$ of the modulation. As the only constraints on the modulation shape, the symmetry of $T_{ON}(\phi)$ is forced around $\pi/2$, with a periodicity of $2\pi/3$. FIG. 16 shows the resulting TON modulation signal shapes obtained for one specific working point ($P_{in}$=33.1 kW), with curve 330 representing the optimal modulation shape, and curve 335 representing the quasi-optimal modulation shape. Both curves of FIG. 16 are plotted as a function of the phase angle ($\phi$=0 to $\pi$) referred to the first phase of the input voltages. As shown, the quasi-optimal solution (curve 335) is very close to the optimal modulation shape (curve 330). The smoother behavior in the vicinity of pi/2 make the quasi-optimal solution much better to use than the actual optimal solution for a tabulated optimization approach, as implemented in the controller 350 of FIG. 14.

In an embodiment, the modulation strategy is determined off-line and tabulated in the control system (see 365, FIG. 14). However, the iterative search method may also be applied in real time using an embodiment of the aforementioned rectifier controller 350. An iterative approach makes the optimal modulation strategy adaptive with respect to any parameter change (such as, shape of the mains input voltages, and aging of the boost inductors and DC capacitors, for example). With an iterative approach, the real time iterative search may be applied to find the optimal modulation signal shape $T_{ON}(P_{in},\phi)$, which means that for the specific instantaneous input power $P_{in}$, the method searches the global shape $T_{ON}(\phi)$ that minimizes the specified cost function discussed previously.

Figure 17:
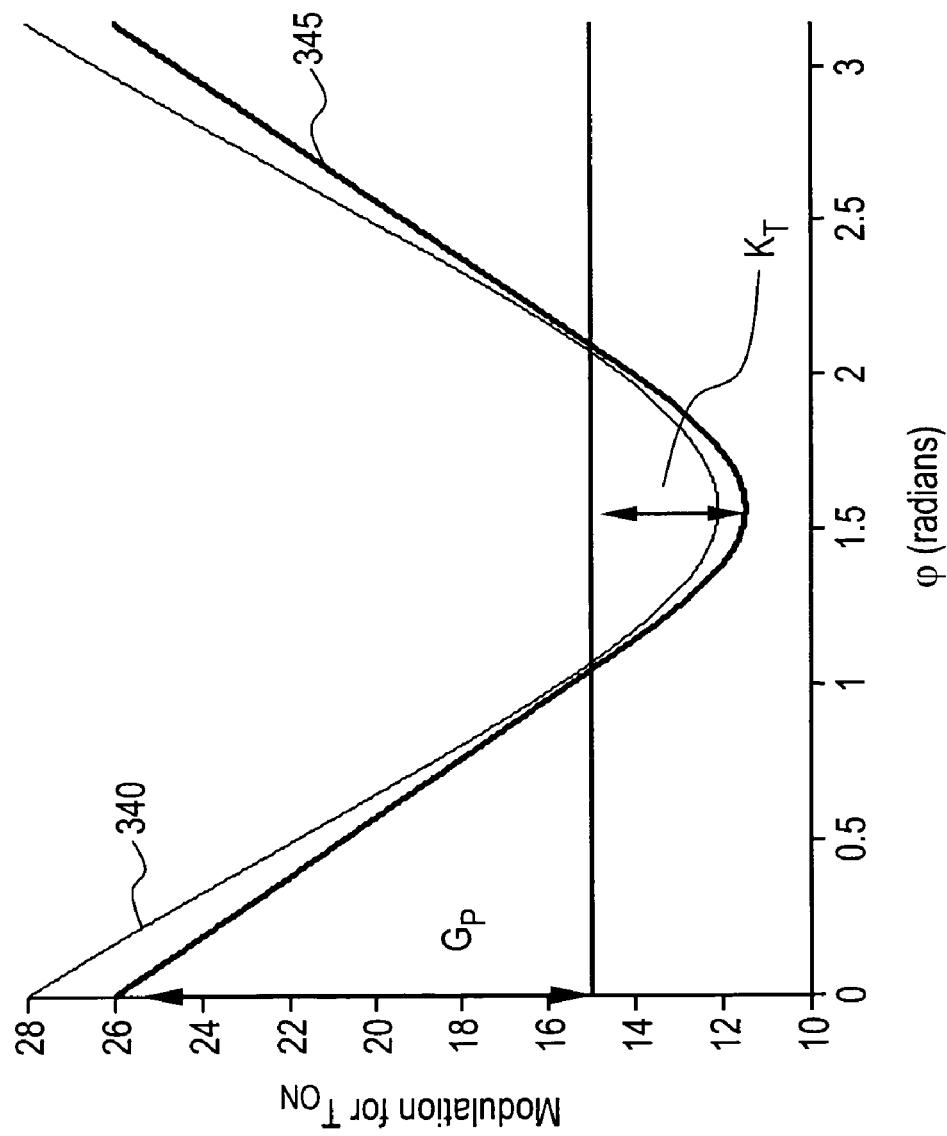
FIG. 17 depicts another exemplary optimal modulation strategy and quasi-optimal modulation strategy in accordance with an embodiment of the invention.

While the aforementioned discussion relating to the determination of the quasi-optimal modulation strategy has been directed primarily to the two-switch boost rectifier 100 of FIG. 1, Equation-4 may also be applied to determine the quasi-optimal modulation strategy for the six-switch boost rectifier 200 of FIG. 3. A solution to Equation-4 for the six-switch rectifier 200 provides the $T_{ON}$ modulation shape illustrated in FIG. 17. As before, FIG. 17 depicts the modulation signal that assigns $T_{ON}(\mu sec)$ as defined by coefficients $K_T$ and $G_P$, as a function of the phase angle ($\phi$=0 to $\pi$) referred to the first phase of the input voltages. The optimal modulation shape is illustrated by curve 340, while the quasi-optimal solution is illustrated by curve 345.

Figure 18:
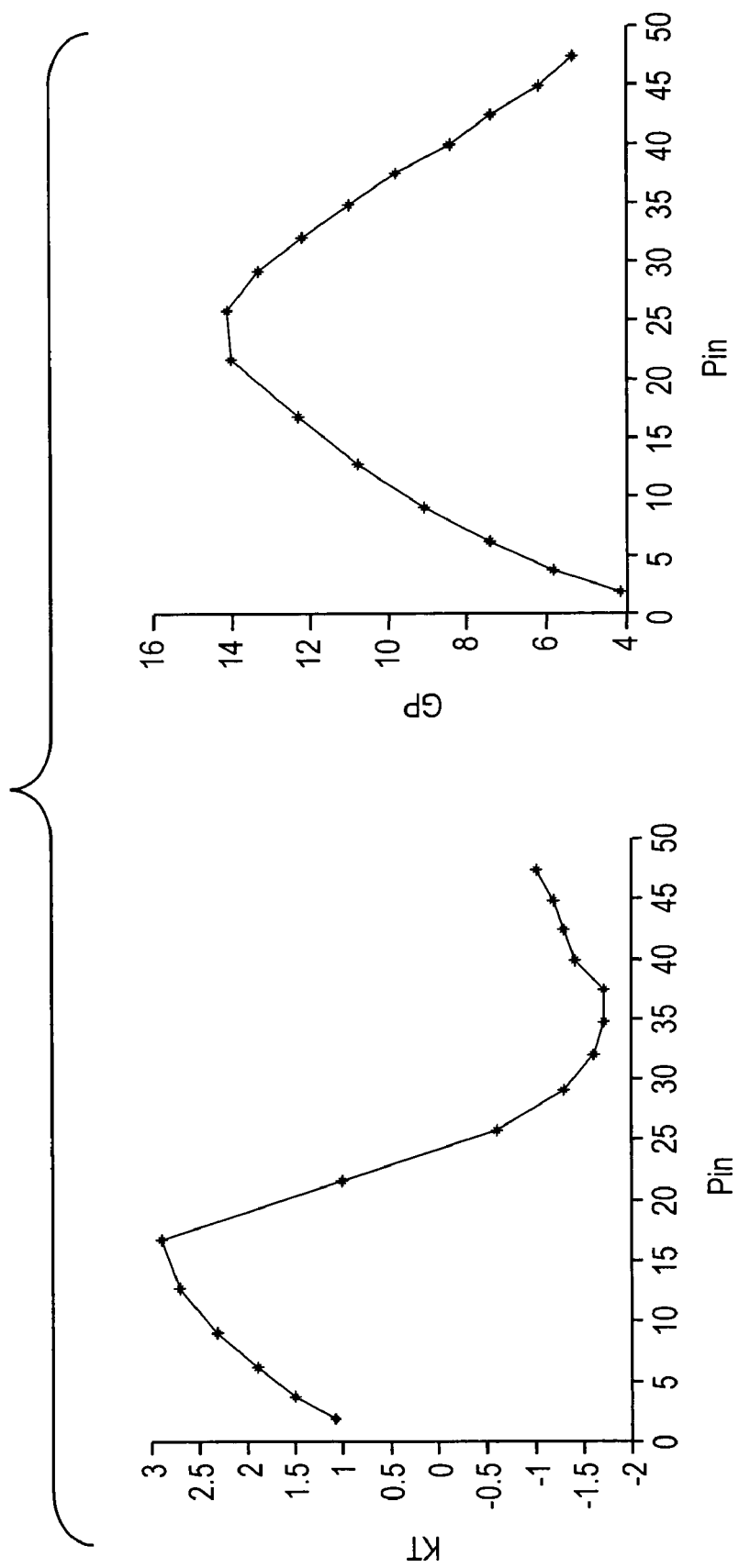
FIG. 18 depicts coefficient values, as a function of input power, for the quasi-optimal modulation signal of FIG. 17 for use in accordance with an embodiment of the invention.

As illustrated, the shape of the quasi-optimal modulation signal 345 may be represented by two linear portions ($\phi \in [0,\pi/3]$ and $\phi \in [2\pi/3, \pi]$) having a maximum excursion defined by the coefficient $G_p$, and by one $3^{rd}$ harmonic portion ($\phi \in [\pi/3, 2\pi/3]$) having a maximum excursion defined by the coefficient $K_T$. As in the previous case, typical cost functions to minimize during the iterative search are given by Equations 5 and 6. Considering the cost function of Equation-5, and the following design case, $$L_b=15.6\ \mu H,\ V_{dc}=215V,\ V_{mains-rms}=120V,\ f_{pmax}=16.67\ kHz, \quad \text{Equa.-8}$$

the iterative search method gives the values of the coefficients $K_T(\mu sec)$ and $G_p(\mu sec)$ as a function of the required input power $P_{in}(kW)$, with the results being illustrated in FIG. 18.

Figure 19:
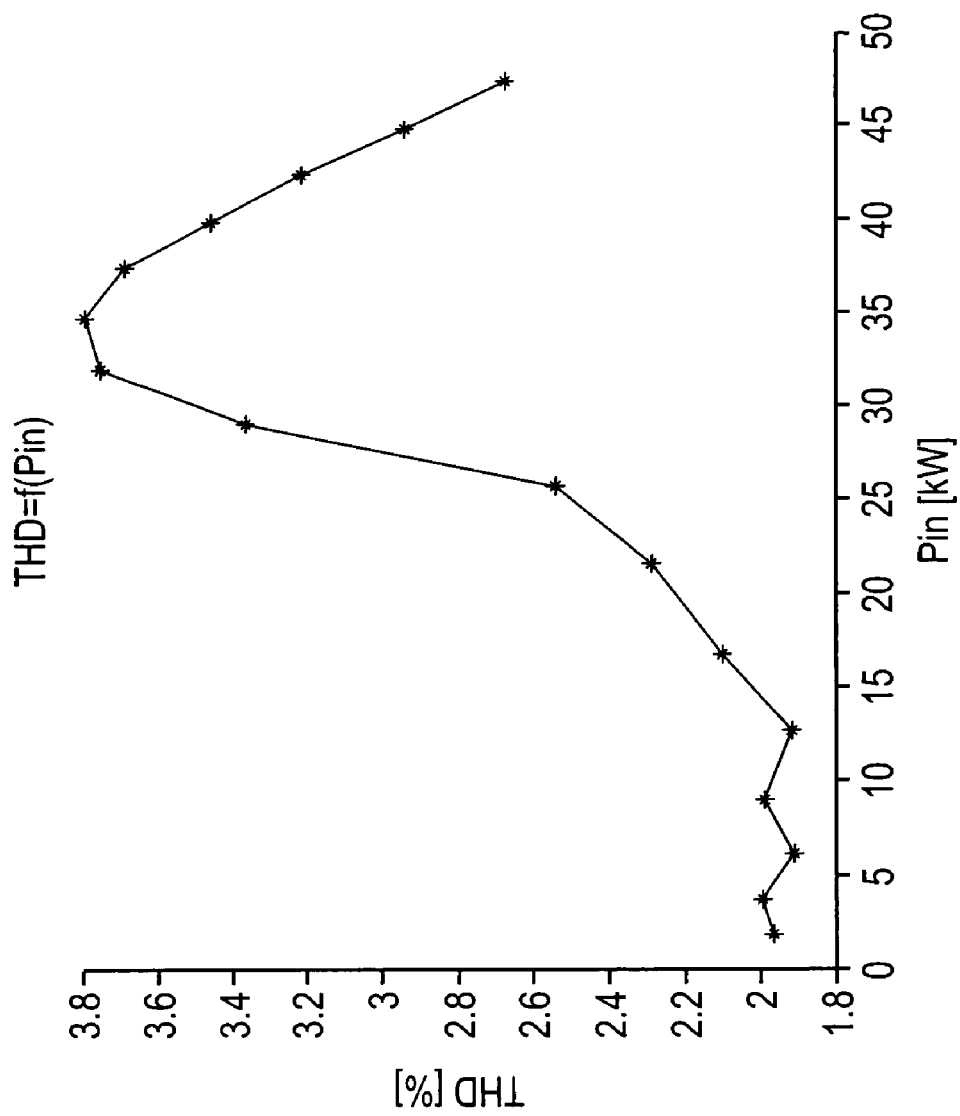
FIG. 19 depicts an exemplary characteristic of THD vs. Pin in accordance with an exemplary embodiment of the invention.

FIG. 19 shows the resulting input THD as a function of the input power $P_{in}$ for a modulated six-switch boost rectifier 200 according to a quasi-optimal modulation strategy considering a design case: $L_b$=15.6 μH, Vdc=215V, Vrms=120V, $f_{pmax}$=16.67 kHz. These results indicate that with the quasi-optimal modulation strategy it is possible for the six-switch boost rectifier 200 to obtain an input THD less then 4% for every load, while at the same time maintaining a limited maximal IGBT current. As before, it should be noted that the results indicated in FIG. 19 do not include the three-phase LC filter ($L_1$-$C_1$, $L_2$-$C_2$ and $L_3$-$C_3$) represented in FIG. 2. Taking this three-phase LC filter into account will add an additional 1% to the input THD. It is this filter that prevents the high frequency harmonics generated by the booster switching from being injected into the mains, thereby affecting the THD of the input voltage.

Figure 20:
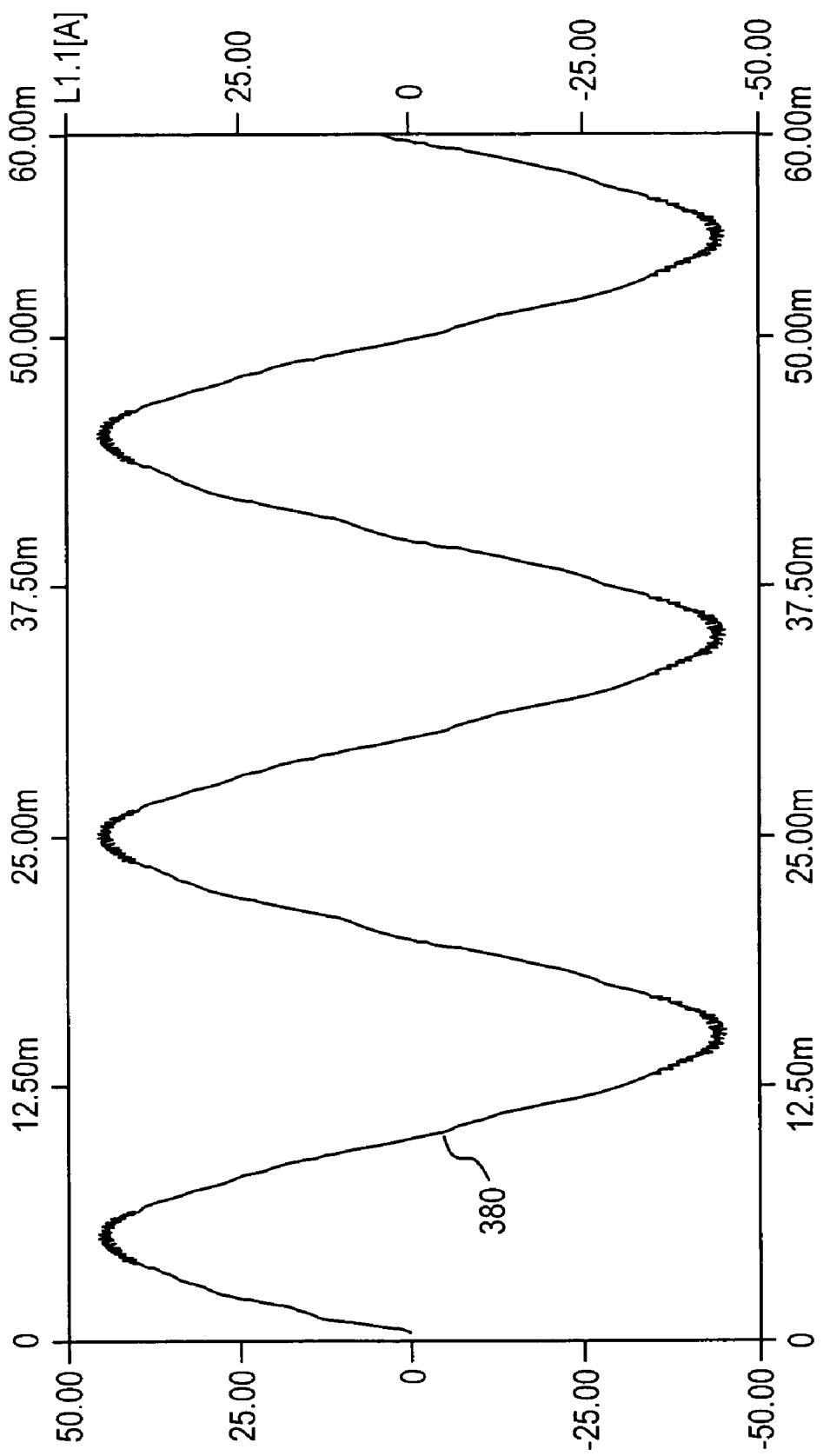
FIG. 20 depicts simulated line current relating to an exemplary embodiment of the invention.

FIG. 20 shows an example of the simulated line current 380 for the quasi-optimal modulation strategy for the six-switch boost rectifier 200. For FIG. 20, the design case considered was:

$$L_b=150\ \mu H,\ V_{dc}=400V,\ V_{mains-rms}=230V,\ f_{pmax}=16.67\ kHz, \quad \text{Equa.-9}$$

in the working point of, $$T_0=37\ \mu s\ (P_{in}\approx 20\ kw),\ K_T=-1.0\ \mu s,\ G_p=4.5\ \mu s, \quad \text{Equa.-10}$$

and with the LC input filter, $$L_f=1000\ \mu H,\ C_f 5\ \mu F. \quad \text{Equa.-11}$$

For the line current 380 of FIG. 20 and according to the design case considered, the THD was found to be 3.1%, whereas the theoretical value coming out of the optimal search (without LC input filter) was found to be 2.4%.

Using an embodiment of the invention, a quasi-optimal modulation strategy applied to a two-switch three-level DCM boost rectifier makes it possible to reach an input THD from 8.5 to 10% on the overall load range together with a limited stress on the IGBTs.

Revisiting Equation-4, the expression for the modulation signal $T_{ON}(\phi)$ may be rewritten more generally as, $$T_{ON}(\phi)=f1(\phi)+f2(\phi)+f3(\phi), \quad \text{Equa.-12}$$

where, $f1(\phi)$ defines a first function comprising a linear characteristic from $0 \leq \phi \leq \pi/3$, $f2(\phi)$ defines a second function comprising a non-linear characteristic from $\pi/3 \leq \phi \leq 2\pi/3$, and $f3(\phi)$ defines a third function comprising another linear characteristic from $2\pi/3 \leq \phi \leq \pi$. Here, $f1(\phi)$ and $f3(\phi)$ may each be triangular functions having a positive peak defined by coefficient $G_P$ at $\phi$ equals $\pi/6$ and $5\pi/6$, respectively, and $f2(\phi)$ may be a quadratic function, such as a third harmonic portion, having a minimum defined by coefficient $K_T$ at $\phi=\pi/2$, such as that illustrated in FIGS. 8, 11 and 16. Alternatively, $f1(\phi)$ may be a linear function having a negative slope and a peak defined by coefficient $G_P$ at $\phi=0$, $f2(\phi)$ may be a quadratic function, such as a third harmonic portion, having a minimum defined by coefficient $K_T$ at $\phi=\pi/2$, and $f3(\phi)$ may be another linear function having a positive slope and a peak defined by coefficient $G_P$ at $\phi=\pi$, such as that depicted in FIG. 17.

In view of the foregoing description, an embodiment of the invention also includes a method for providing three level dc voltage by receiving filtered and rectified three-phase ac voltage, boosting individually the rectified power of each phase, and combining the boosted power to provide two-phase dc power output. Prior to receiving the filtered and rectified three-phase ac power, the method may also include the filtering of the three-phase ac power and the rectifying of the filtered power of each phase.

An exemplary embodiment of the invention also includes a six-switch three-level DCM boost rectifier topology that allows a clean input to be obtained without sacrificing other important quality aspects, in particular the efficiency. Together with an embodiment of the aforementioned quasi-optimal modulation strategy, an exemplary embodiment of the six-switch topology makes it possible to reach an input THD from 3 to 5% over the full load range while keeping the efficiency around 98%. The disclosed quasi-optimal modulation strategies for DCM boost rectifiers in accordance with embodiments of the invention make it possible to maximize the overall performance of these converters while avoiding the use of alternative topologies or additional passive filters.

Exemplary embodiments of the invention have been reduced to practice in a transformerless UPS from 30 to 120 kVA. Embodiments are contemplated for use in UPSs without output isolation transformers.

While exemplary embodiments have been described employing IGBTs in a booster section, it will be appreciated that other electronic switches such as a SCR (silicon-controlled rectifier), MOSFET (metal-oxide-semiconductor field-effect transistor), GTO (gate turn-off thyristor), or IGCT (integrated gate commutated thyristor), may also be used. Accordingly, the term IGBT as used in the aforementioned description may be replaced by the term electronic switch. Furthermore, while each booster section has been described employing diodes, it will be appreciated that other rectifier devices such as SCRs may also be used. Accordingly the term diode as used in the aforementioned description may be replaced by the term rectifier device.

An embodiment of the invention may be embodied in the form of computer-implemented processes and apparatuses for practicing those processes. The present invention may also be embodied in the form of computer program code containing instructions embodied in tangible media, such as floppy diskettes, CD-ROMs, hard drives, memory chips, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to provide a quasi-optimal modulation signal for controlling a booster section of a DCM boost rectifier for realizing reduced input THD as a function of the input power Pin.

As disclosed, some embodiments of the invention may include some of the following advantages: a six-switch three-level DCM boost rectifier having the three phases controlled independently allowing operation at a high power factor and with a low total harmonic distortion, while at the same time maintaining a high efficiency; a rectifier topology with or without an optimal modulation strategy that may be applied to front end converters of any power level, where typical applications of the converters may include UPSs, frequency converters and drives, for example; the determination of a modulation strategy by an iterative search method enabling a desired Cost Function (CF) to be optimized, where an exemplary cost function is the input THD, but any other constraints may be added; as applied to a two-switch three-level DCM boost rectifier, providing for the determination of an optimal modulation strategy making it possible to reach 8.5 to 10% input THD on the overall load range together with a limited stress on the IGBTs; as applied to a six-switch three-level DCM boost rectifier, providing for the determination of an optimal modulation strategy making it possible to reach 3 to 5% input THD on the overall load range together with a limited stress on the IGBTs; providing for the optimal modulation strategy to be determined off-line and tabulated in the control system; providing for the optimal modulation strategy to be determined in real time via an iterative search method, thereby making the optimal modulation strategy adaptive with respect to any parameter change, such as the shape of mains input voltages, aging of the boost inductors and DC capacitors, for example; and, the ability to apply an exemplary rectifier topology and quasi-optimal modulation strategy, as herein described, to front end converters of any power level, where such applications may include UPSs, frequency converters and drives, for example.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for modulating a discontinuous conduction mode (DCM) Boost Rectifier having a switchable booster section, the method comprising:

defining a booster section ON time modulation signal having a modulation characteristic according to the following equation:

$$T_{ON}(\phi)=f1(\phi)+f2(\phi)+f3(\phi),$$

where, $\phi$ defines a phase angle for an input phase voltage of the DCM Boost Rectifier;

$T_{ON}(\phi)$ defines a modulation characteristic for an ON time of the booster section, and is a continuous function;

$f1(\phi)$ defines a first function from $0 \leq \phi \leq \pi/3$;

$f2(\phi)$ defines a second function from $\pi/3 \leq \phi \leq 2\pi/3$;

$f3(\phi)$ defines a third function from $2\pi/3 \leq \phi \leq \pi$; and modulating the switchable booster section using the modulation signal.

2. The method of claim 1, wherein:

the $f1(\phi)$ function comprises a linear characteristic;

the $f2(\phi)$ function comprises a non-linear characteristic; and the $f3(\phi)$ function comprises a linear characteristic.

3. The method of claim 1, wherein:

$f1(\phi)$ and $f3(\phi)$ are each triangular functions having a positive peak at $\phi$ equals $\pi/6$ and $5\pi/6$, respectively.

4. The method of claim 1, wherein:

$f1(\phi)$ is a linear function having a negative slope and a peak at $\phi=0$; and $f3(\phi)$ is a linear function having a positive slope and a peak at $\phi=\pi$.

5. The method of claim 1, wherein:

$f2(\phi)$ is a quadratic function having a minimum at $\phi=\pi/2$.

6. The method of claim 1, wherein:

$T_{ON}(\phi)$ is defined by:

$$T_{ON}(\phi)=K*[Vdc(\phi)-V\max(\phi)]^{0.5},$$

where,
- K defines a factor proportional to the active power to be drawn by the DCM Boost Rectifier;
- Vdc defines the output voltage of the DCM Boost Rectifier;
- Vmax defines the voltage on the input phase of the DCM Boost Rectifier having the maximum amplitude.

7. The method of claim 6, wherein:
the modulation characteristic shape of $T_{ON}$, as a function of the angle $\phi$, is composed of two triangular portions each having a maximum amplitude defined by coefficient $G_p$, and by a third harmonic portion having a minimum value defined by coefficient $K_T$, the $K_T$ minimum being intermediate the two $G_p$ maximums.

8. The method of claim 7, wherein:
the two triangular portions are defined at phase voltage angles $0 \leq \phi \leq \pi/3$ and $2\pi/3 \leq \phi \leq \pi$, respectively; and
the third harmonic portion is defined at phase voltage angles $\pi/3 \leq \phi \leq 2\pi/3$.

9. The method of claim 6, wherein:
the modulation characteristic shape of $T_{ON}$, as a function of the angle $\phi$, is composed of two straight line portions each having a maximum amplitude defined by coefficient $G_p$, and by a third harmonic portion having a minimum value defined by coefficient $K_T$, the $K_T$ minimum being intermediate the two $G_p$ maximums.

10. The method of claim 9, wherein:
the two straight line portions are defined at phase voltage angles $0 \leq \phi \leq \pi/3$ and $2\pi/3 \leq \phi \leq \pi$, respectively; and
the third harmonic portion is defined at phase voltage angles $\pi/3 \leq \phi \leq 2\pi/3$.

11. The method of claim 1, further comprising:
providing the modulation signal to a two-switch three level DCM Boost Rectifier.

12. The method of claim 1, further comprising:
providing the modulation signal to a six-switch three level DCM Boost Rectifier.

13. The method of claim 8, further comprising:
providing the modulation signal to a two-switch three level DCM Boost Rectifier.

14. The method of claim 10, further comprising:
providing the modulation signal to a six-switch three level DCM Boost Rectifier.

15. The method of claim 1, further comprising:
performing an iterative analysis on the modulation signal for a specified DCM Boost Rectifier in order to satisfy a defined set of cost functions, thereby defining a quasi-optimal modulation signal; and
wherein the modulating comprises modulating the switchable booster section using the quasi-optimal modulation signal.

16. An apparatus for modulating a discontinuous conduction mode (DCM) Boost Rectifier having a switchable booster section, the apparatus comprising a processor operable in response to executable instructions for:
modulating the switchable booster section using a defined ON time modulation signal having a modulation characteristic according to the following equation:

$$T_{ON}(\phi) = f1(\phi) + f2(\phi) + f3(\phi),$$

where,
- $\phi$ defines a phase angle for an input phase voltage of the DCM Boost Rectifier;
- $T_{ON}(\phi)$ defines a modulation characteristic for an ON time of the booster section, and is a continuous function;
- $f1(\phi)$ defines a first function comprising a linear characteristic from $0 \leq \phi \leq \pi/3$;
- $f2(\phi)$ defines a second function comprising a non-linear characteristic from $\pi/3 \leq \phi \leq 2\pi/3$; and
- $f3(\phi)$ defines a third function comprising a linear characteristic from $2\pi/3 \leq \phi \leq \pi$.

17. The apparatus of claim 16, wherein the switchable booster section comprises a two-switch booster section, and wherein the processor is further operable in response to executable instructions for:
modulating the two-switch booster section wherein:
- $f1(\phi)$ and $f3(\phi)$ are each triangular functions having a positive peak at $\phi$ equals $\pi/6$ and $5\pi/6$, respectively; and
- $f2(\phi)$ is a quadratic function having a minimum at $\phi = \pi/2$.

18. The apparatus of claim 16, wherein the switchable booster section comprises a six-switch booster section, and wherein the processor is further operable in response to executable instructions for:
modulating the six-switch booster section wherein:
- $f1(\phi)$ is a linear function having a negative slope and a peak at $\phi = 0$;
- $f2(\phi)$ is a quadratic function having a minimum at $\phi = \pi/2$; and
- $f3(\phi)$ is a linear function having a positive slope and a peak at $\phi = \pi$.

19. The apparatus of claim 16, wherein the processor is further operable in response to executable instructions for:
prior to the modulating, defining the modulation signal for a specified DCM Boost Rectifier that satisfies a defined set of cost functions, thereby defining a quasi-optimal modulation signal.

20. The apparatus of claim 19, wherein the processor is further operable in response to executable instructions for:
defining the modulation signal by reference to a look up table, defining the modulation signal by performing a real-time iterative analysis relating to an operational parameter of the DCM Boost Rectifier, or both.

* * * * *